United States Patent
Lee

(10) Patent No.: US 7,304,709 B2
(45) Date of Patent: Dec. 4, 2007

(54) FRINGE FIELD SWITCHING MODE LIQUID CRYSTAL DISPLAY DEVICE AND METHOD OF FABRICATING THE SAME

(75) Inventor: Yun-Bok Lee, Seoul (KR)

(73) Assignee: LG. Philips Lcd Co., Ltd., Seoul (KR)

( * ) Notice: Subject to any disclaimer, the term of this patent is extended or adjusted under 35 U.S.C. 154(b) by 338 days.

(21) Appl. No.: 10/874,416

(22) Filed: Jun. 23, 2004

(65) Prior Publication Data
US 2005/0128401 A1 Jun. 16, 2005

(30) Foreign Application Priority Data
Dec. 12, 2003 (KR) ............. 10-2003-0090822
Jun. 10, 2004 (KR) ............. 10-2004-0042621

(51) Int. Cl.
*G02F 1/1343* (2006.01)
(52) U.S. Cl. ............................ 349/143; 349/139
(58) Field of Classification Search ........... 349/139, 349/143
See application file for complete search history.

(56) References Cited

U.S. PATENT DOCUMENTS

| | | | | |
|---|---|---|---|---|
| 5,598,285 | A * | 1/1997 | Kondo et al. ........... | 349/39 |
| 6,356,328 | B1 * | 3/2002 | Shin et al. ............. | 349/141 |
| 6,411,357 | B1 | 6/2002 | Ting et al. | |
| 6,567,144 | B1 * | 5/2003 | Kim et al. ............. | 349/128 |
| 6,762,815 | B2 * | 7/2004 | Lee ..................... | 349/141 |
| 6,989,876 | B2 * | 1/2006 | Song et al. ............ | 349/109 |
| 2001/0019382 | A1 * | 9/2001 | Song et al. ............ | 349/106 |
| 2003/0053020 | A1 * | 3/2003 | Okada et al. .......... | 349/139 |

FOREIGN PATENT DOCUMENTS

| | | |
|---|---|---|
| JP | 09-230311 | 9/1997 |
| JP | 11-174482 | 7/1999 |
| JP | 2000-066621 | 3/2000 |
| JP | 2000-206553 | 7/2000 |
| JP | 2002-006303 | 1/2002 |
| KR | 1999-0048947 | 7/1999 |
| KR | 1999-0058889 | 7/1999 |
| KR | 10-0341123 | 12/2002 |

OTHER PUBLICATIONS

An Office Action dated Aug. 29, 2006 for corresponding Japanese Patent Application No. 2004-192294.
An Office Action dated Jan. 25, 2006 for corresponding Korean Application No. 10-2004-0042621.

* cited by examiner

*Primary Examiner*—Michael H. Caley
(74) *Attorney, Agent, or Firm*—Brinks Hofer Gilson & Lione

(57) ABSTRACT

A fringe field switching mode liquid crystal display device includes opposing first and second substrates having a liquid crystal layer disposed therebetween. A gate line and a data line crossing the gate line define a pixel region on the first substrate. A thin film transistor is connected to the gate line and the data line, a common line is parallel to and spaced apart from the gate line, and a common electrode extends from the common line. A pixel electrode is connected to the thin film transistor and overlaps the common electrode. One of the pixel and common electrodes is substantially square and the other has a circular or spiral shape.

52 Claims, 31 Drawing Sheets

FRINGE FIELD SWITCHING MODE LIQUID CRYSTAL DISPLAY DEVICE AND METHOD OF FABRICATING THE SAME

This application claims the benefit of Korean Patent Application Nos. 2003-0090822, filed on Dec. 12, 2003, and 2004-0042621, filed on Jun. 10, 2004, which are hereby incorporated by reference as if fully set forth herein.

BACKGROUND OF THE INVENTION

1. Field of the Invention

The present invention relates to a liquid crystal display device. More particularly, it relates to a liquid crystal display device having high transmittance and high aperture ratio and a method of fabricating the same.

2. Discussion of the Related Art

Liquid crystal display (LCD) devices are being developed as the next generation display devices because of their characteristics of light weight, thin profile, and low power consumption. In general, an LCD device is a non-emissive display device that displays images by making use of a refractive index difference through utilizing optical anisotropy properties of a liquid crystal material interposed between an array substrate and a color filter substrate. Of the different types of known liquid crystal displays (LCDs), active matrix LCDs (AM-LCDs), which have thin film transistors (TFTs) and pixel electrodes arranged in a matrix form, are the subject of significant research and development because of their high resolution and superiority in displaying moving images.

A conventional LCD device, generally, uses twisted nematic (TN) mode liquid crystal, the orientation of which is parallel to substrates and is continuously twisted from one substrate to another substrate by 90 degrees. However, the TN mode LCD device has disadvantages of a narrow viewing angle and slow response characteristics.

To solve the above problems, various modes, such as a multi-domain TN structure and an optically compensated birefringence (OCB) mode, have been proposed. In the multi-domain TN structure, a pixel is divided into several domains. The process of manufacturing the multi-domain is complicated, and improvement of the viewing angle is limited. The OCB mode has wide viewing angles and fast response time. However, in the OCB mode, it is difficult to control and maintain the liquid crystal material stably due to bias voltage.

In-plane switching mode liquid crystal display (IPS-LCD) devices, recently, have been proposed as a new display mode. In the IPS-LCD devices, electrodes for driving liquid crystal molecules are formed on the same substrate.

FIG. 1 is a cross-sectional view illustrating the concept of a related art IPS-LCD device. As shown in FIG. 1, an upper substrate 10 and a lower substrate 20 are spaced apart from each other, and a liquid crystal layer 30 is interposed therebetween. The upper substrate 10 and lower substrate 20 are often referred to as a color filter substrate and an array substrate, respectively. A common electrode 22 and a pixel electrode 24 are positioned on the lower substrate 20. The common electrode 22 and pixel electrode 24 are positioned such that they are parallel to each other. On a surface of the upper substrate 10, a color filter layer (not shown) is commonly positioned to correspond to an area between the pixel electrode 24 and the common electrode 22 of the lower substrate 20.

A voltage applied across the common electrode 22 and pixel electrode 24 produces an in-plane electric field 26 through liquid crystal molecules of the liquid crystal layer 30. The liquid crystal molecules have a positive dielectric anisotropy, and thus the liquid crystal molecules will align so as to be in parallel with the electric field 26. The viewing angles can range 80 to 85 degrees in up-and-down and left-and-right sides from a line vertical to the IPS-LCD device, for example.

FIG. 2 is a plane view of an array substrate according to the related art IPS-LCD device. As shown in FIG. 2, a gate line 40 and a data line 42 cross each other to define a pixel region P. At a crossing of the gate line 40 and the data line 42, a thin film transistor T is formed. A common line 44 is spaced apart from the gate line 40, and in the pixel region P, a plurality of common electrodes 46 extends from the common line 44 parallel to the data line 42.

A first pixel connecting line 48 is connected to the thin film transistor T, and a plurality of pixel electrodes 50 extends from the first pixel connecting line 48 alternating with the plurality of common electrodes 46. A second pixel connecting line 52 connects ends of the plurality of pixel electrodes 50, and the second pixel connecting line 52 overlaps the common line 44. The overlapped common line 44 and second pixel connecting line 52 form a storage capacitor $C_{ST}$ with an insulating layer interposed therebetween.

Spaces between the common electrodes 46 and the pixel electrodes 50 correspond to aperture areas A, where liquid crystal molecules are driven by an electric field parallel to a substrate. In the above array substrate, there exist 4 blocks of 4 aperture areas A in one pixel. That is, in the pixel region P, three common electrodes 46 and two pixel electrodes 50 alternate with each other.

The common electrodes 46 include two first common electrodes 46a that are near to the data line 42 and a second common electrode 46b that is disposed between the first common electrodes 46a. To minimize cross-talk between the data line 42 and the pixel electrodes 50 and to prevent light leakage, the first common electrodes 46a should have a wider width than the second common electrode 46b, and this reduces an aperture ratio.

To improve the aperture ratio and transmittance of the related art IPS-LCD device, a fringe field switching (FFS) mode LCD device has been suggested. The FFS mode LCD device has a square common electrode of an island shape corresponding to the pixel region and a pixel electrode consisting of a plurality of rods that are spaced apart from each other and forming slits. The common electrode and the pixel electrode overlap each other with an insulating layer interposed therebetween. In the FFS mode LCD device, since electric fields are induced every several angstroms, the electric fields are strong, and thus even the liquid crystal molecules over the electrodes can be arranged by the electric fields. In addition, because the common electrode and the pixel electrode are formed of a transparent conductive material, the aperture ratio may be improved.

FIG. 3A is a plan view illustrating an FFS mode LCD device according to the related art, and FIG. 3B is a cross-sectional view along the line IIIB-IIIB of FIG. 3A. FIG. 3A shows mainly an array substrate of the FFS mode LCD device, and FIG. 3B illustrates a cross-section of the FFS mode LCD device including a liquid crystal layer in a corresponding cutting area.

In FIG. 3A, a gate line 62 and a data line 78 cross each other to define a pixel region P. A thin film transistor T is formed at a crossing of the gate line 62 and the data line 78. In the pixel region P, a plurality of pixel electrodes 82 connected to the thin film transistor T are spaced apart from each other. A common electrode 68 extends below the plurality of pixel electrodes 82.

More particularly, the thin film transistor T includes a gate electrode 64, a semiconductor layer 72, a source electrode 74 and a drain electrode 76. A first pixel connecting line 84 is connected to the drain electrode 76, and the plurality of pixel electrodes 82 extends from the first pixel connecting line 84. Ends of the plurality of pixel electrodes 82 are electrically connected to each other by a second pixel connecting line 86. The common electrode 86 of each pixel region P is connected to a common line 66, which is spaced apart from and is parallel to the gate line 62.

The common electrode 68 and the plurality of pixel electrodes 82 are formed of a transparent conductive material through different processes. The common line 66 is formed of the same material through the same process as the gate line 62. The common electrode 68 directly contacts the common line 66 without an insulating layer therebetween, and the plurality of pixel electrodes 82 are disposed over the common electrode 68 with an interposed insulating layer (not shown).

Operations of the FFS mode LCD device will be explained hereinafter through the cross-sectional structure of FIG. 3B. In FIG. 3B, a square common electrode 68 is formed on a first substrate 60, and a first insulating layer 70 covers the common electrode 68. A plurality of pixel electrodes 82 are formed on the first insulating layer 70 over the common electrode 68. The plurality of pixel electrodes 82 form slit shapes that spaced apart from each other. A first alignment layer 88 covers the plurality of pixel electrodes 82.

A second substrate 90 is spaced apart from and faces the first substrate 60. A color filter layer 92 and a second alignment layer 94 are sequentially formed on an inner surface of the second substrate 90. A liquid crystal layer 96 is interposed between the first and second alignment layers 88 and 94.

In the FFS mode, the liquid crystal molecules between the electrodes are rotated by a lateral electric field to be parallel with the substrates, and then the liquid crystal molecules over the electrodes rotate due to vertical and lateral electric fields around the electrodes and an elastic force of the liquid crystal. That is, because light is also transmitted over the electrode, the transmittance is high. Moreover, rotation rates of the liquid crystal molecules are different in one pixel, and thus color shift is decreased by self-compensating effects.

If the electrodes have stripe shapes, to form a lateral electric field, an alignment direction makes an angle of about 60 degrees with the gate line, which is a base line of 0 degree. Since the alignment direction is also inclined with respect to light transmission axes of polarizers (not shown), ranges of the viewing angle become non-uniform. The alignment direction may be within a range of 90 degrees to −270 degrees with respect to the base line, and the light transmission axes of the polarizers, which are 0 degrees and 90 degrees with respect to the base line, respectively, cross each other at a right angle. Therefore, viewing angle characteristics are lowered at directions of 45 degrees and 135 degrees. In addition, a color shift difference occurs that is directionally dependent.

SUMMARY OF THE INVENTION

An FFS mode LCD device having an improved viewing angle and a method of fabricating the same is presented in which the color shift is minimized.

In one aspect, a fringe field switching mode liquid crystal display device includes a gate line on a first substrate, a data line crossing the gate line to define a pixel region, a thin film transistor connected to the gate line and the data line, a common line parallel to and spaced apart from the gate line, a common electrode extending from the common line and having a substantially square shape corresponding to the pixel region, a pixel electrode connected to the thin film transistor and having a ring shape, wherein the pixel electrode overlaps the common electrode, a second substrate facing the first substrate, and a liquid crystal layer between the first substrate and the second substrate.

In another aspect, a fringe field switching mode liquid crystal display device includes a gate line on a first substrate, a data line crossing the gate line to define a pixel region, a thin film transistor connected to the gate line and the data line, a pixel electrode connected to the thin film transistor and having a substantially square shape, a common line parallel to and spaced apart from the gate line, a common electrode extending from the common line and having a circular shape, wherein the common electrode overlaps the pixel electrode, a second substrate facing the first substrate, and a liquid crystal layer between the first substrate and the second substrate.

In another aspect, a fringe field switching mode liquid crystal display device includes a gate line on a first substrate, a data line crossing the gate line to define a pixel region, a thin film transistor connected to the gate line and the data line, a common line parallel to and spaced apart from the gate line, a common electrode extending from the common line and having a substantially square shape corresponding to the pixel region, a pixel electrode connected to the thin film transistor and having a spiral shape, wherein the pixel electrode overlaps the common electrode, a second substrate facing the first substrate, and a liquid crystal layer between the first substrate and the second substrate.

In another aspect, a fringe field switching mode liquid crystal display device includes a gate line on a first substrate, a data line crossing the gate line to define a pixel region, a thin film transistor connected to the gate line and the data line, a pixel electrode connected to the thin film transistor and having a substantially square shape, a common line parallel to and spaced apart from the gate line, a common electrode extending from the common line and having an opening of a spiral shape, the common electrode overlapping the pixel electrode, a second substrate facing the first substrate, and a liquid crystal layer between the first substrate and the second substrate.

In another aspect of the present invention, a method of fabricating a fringe field switching mode liquid crystal display device includes forming a gate line on a substrate, forming a data line crossing the gate line to define a pixel region, forming a thin film transistor connected to the gate line and the data line, forming a common line parallel to and spaced apart from the gate line, forming a common electrode extending from the common line and having a substantially square shape, and forming a pixel electrode connected to the thin film transistor and having a ring shape, the pixel electrode overlapping the common electrode.

In another aspect, a method of fabricating a fringe field switching mode liquid crystal display device includes forming a gate line on a substrate, forming a data line crossing the gate line to define a pixel region, forming a thin film transistor connected to the gate line and the data line, forming a pixel electrode connected to the thin film transistor and having a substantially square shape, forming a common line parallel to and spaced apart from the gate line, and forming a common electrode extending from the common line and having a circular shape, the common electrode overlapping the pixel electrode.

In another aspect, a method of fabricating a fringe field switching mode liquid crystal display device includes forming a gate line on a substrate, forming a data line crossing the gate line to define a pixel region, forming a thin film transistor connected to the gate line and the data line, forming a common line parallel to and spaced apart from the gate line, forming a common electrode extending from the common line and having a substantially square shape, and forming a pixel electrode connected to the thin film transistor and having a spiral shape, the pixel electrode overlapping the common electrode.

In another aspect, a method of fabricating a fringe field switching mode liquid crystal display device includes forming a gate line on a substrate, forming a data line crossing the gate line to define a pixel region, forming a thin film transistor connected to the gate line and the data line, forming a pixel electrode connected to the thin film transistor and having a substantially square shape, forming a common line parallel to and spaced apart from the gate line, and forming a common electrode extending from the common line and having an opening of a spiral shape, the common electrode overlapping the pixel electrode.

In another aspect, a fringe field switching mode liquid crystal display device includes a first substrate, a gate line on the first substrate, a data line crossing the gate line to define a pixel region, a thin film transistor connected to the gate line and the data line, a common line parallel to and spaced apart from the gate line, a common electrode connected with the common line, a pixel electrode connected to the thin film transistor, the pixel electrode overlapping the common electrode, a second substrate facing the first substrate, and a liquid crystal layer between the first substrate and the second substrate, wherein the pixel and common electrodes are arranged in a multi-domain structure in which liquid crystals in the liquid crystal layer are substantially radially aligned from a center of the pixel region when a potential difference exists between the pixel and common electrodes.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate an embodiment of the present invention and together with the description serve to explain the principles of that invention.

DETAILED DESCRIPTION OF THE ILLUSTRATED EMBODIMENTS

Reference will now be made in detail to an illustrated embodiment of the present invention, examples of which are shown in the accompanying drawings. Wherever possible, similar reference numbers will be used throughout the drawings to refer to the same or similar parts.

Figure 1:
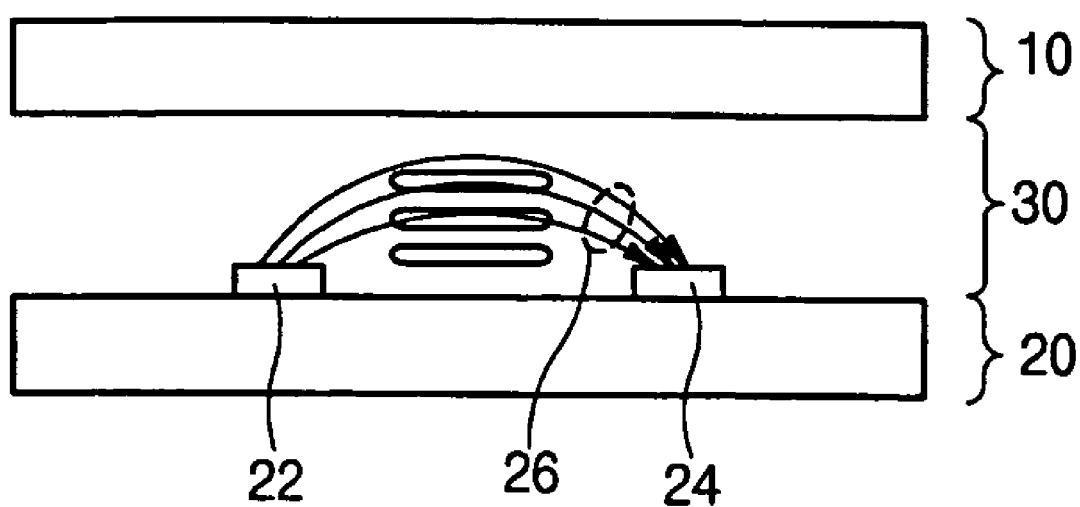
FIG. 1 is a cross-sectional view illustrating a related art IPS-LCD device.
Figure 2:
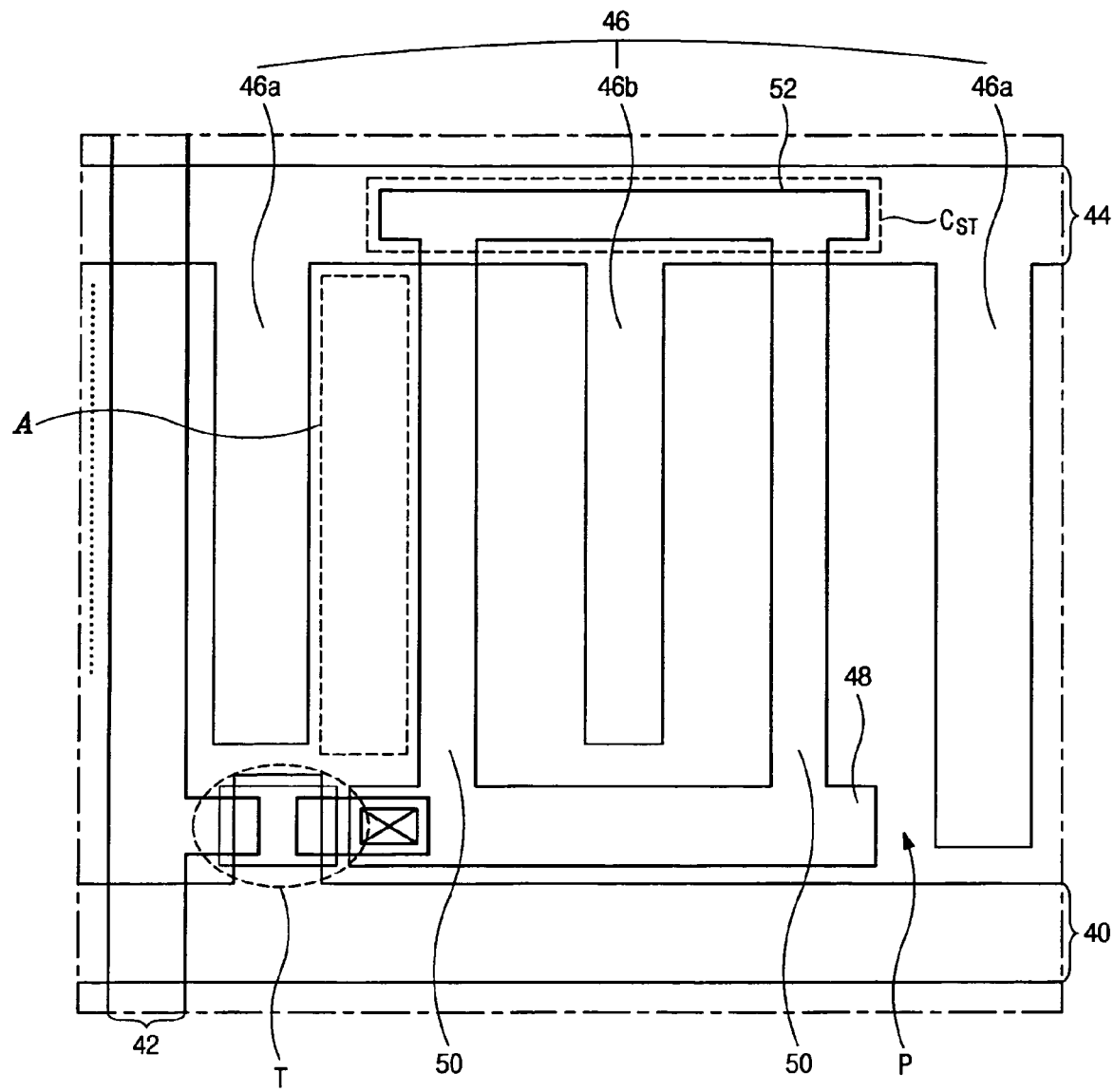
FIG. 2 is a plane view of an array substrate according to the related art IPS-LCD device.
Figure 3A:
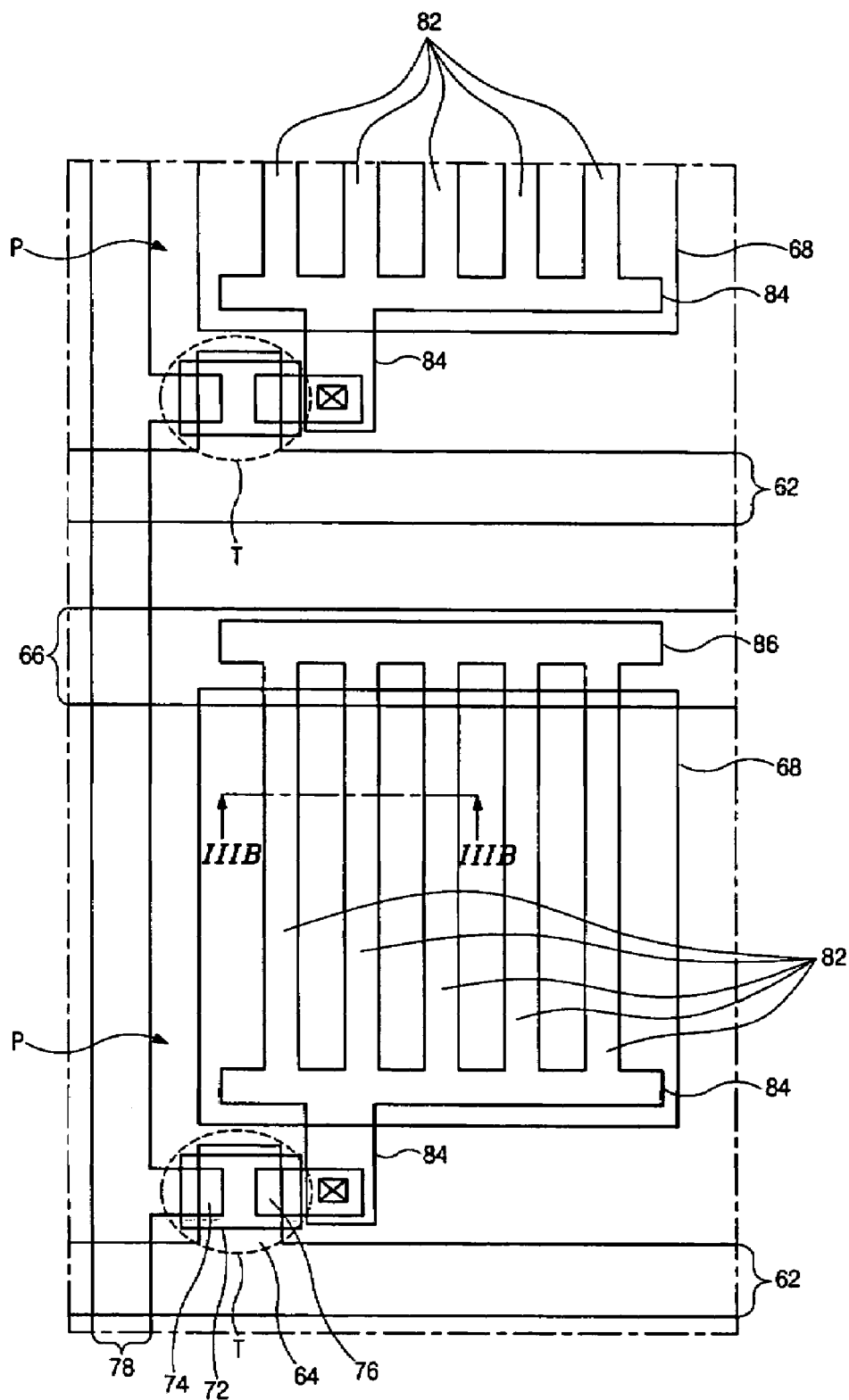
FIG. 3A is a plan view illustrating an FFS mode LCD device according to the related art.
Figure 3B:
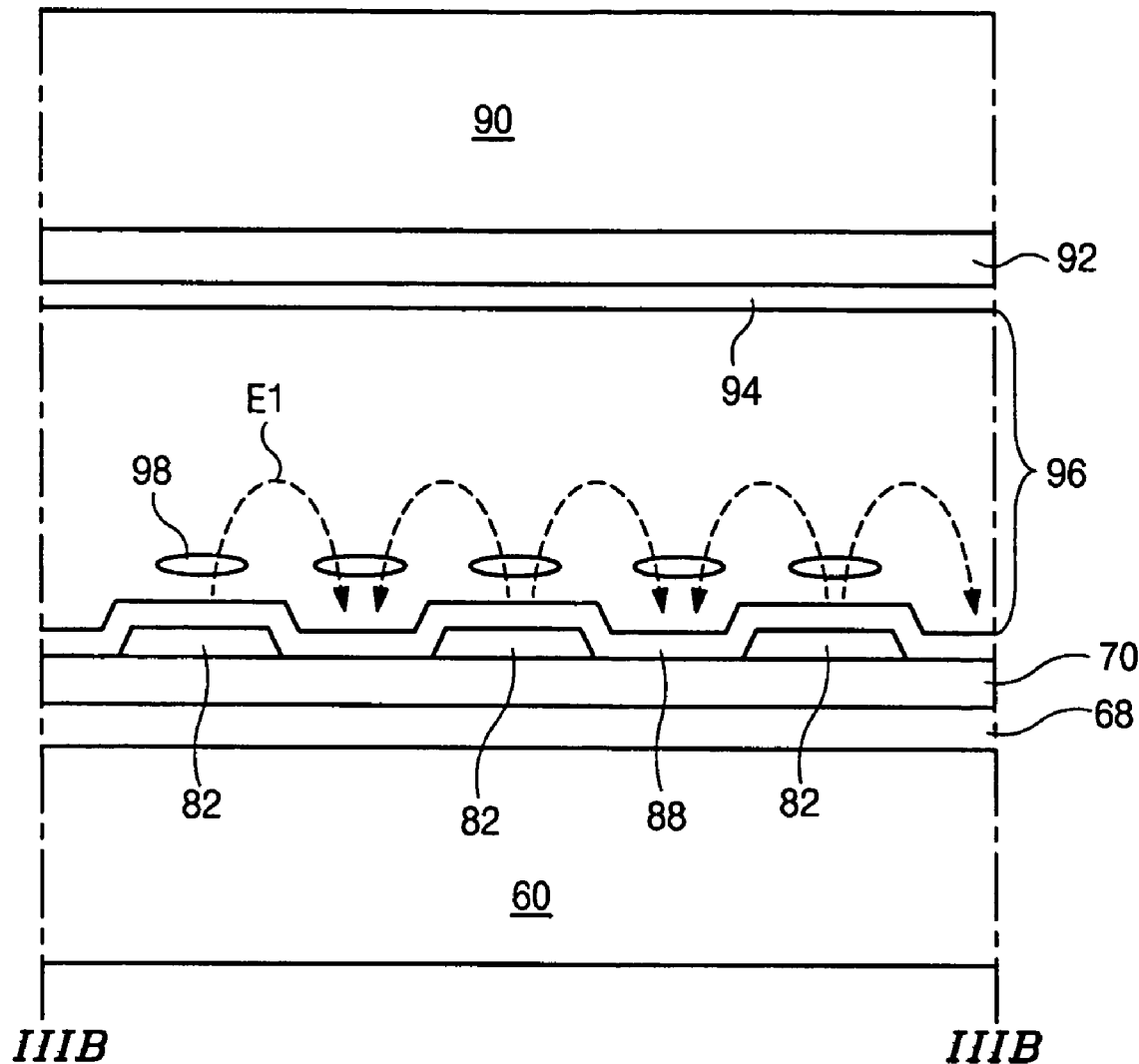
FIG. 3B is a cross-sectional view along the line IIIB-IIIB of FIG. 3A.
Figure 4A:
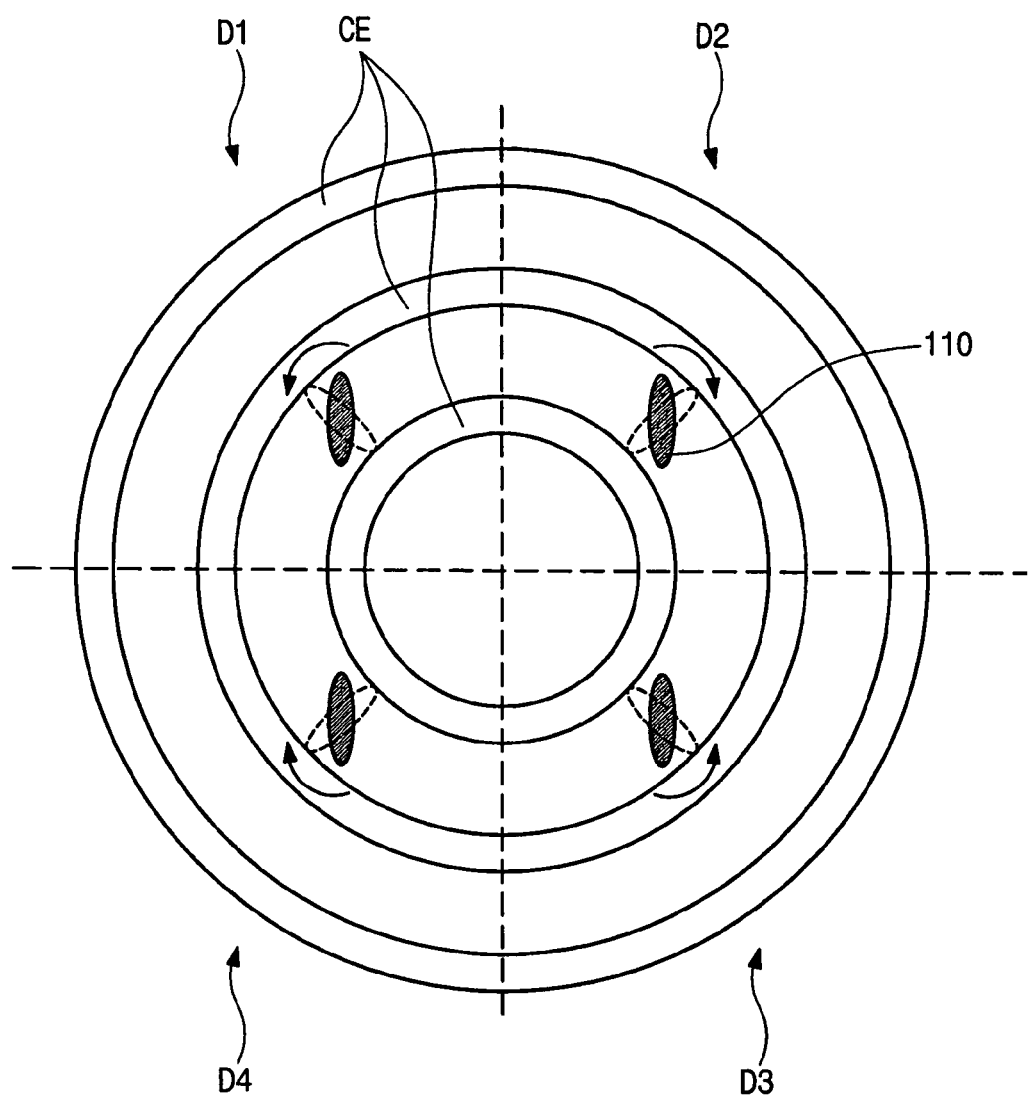
FIG. 4A is a view illustrating an electrode structure of a circular band shape for an FFS mode LCD device according to the present invention and FIG. 4B is a graph showing transmittance-voltage (T-V) characteristics of the FFS mode having the electrode of the circular band shape.
Figure 4B:
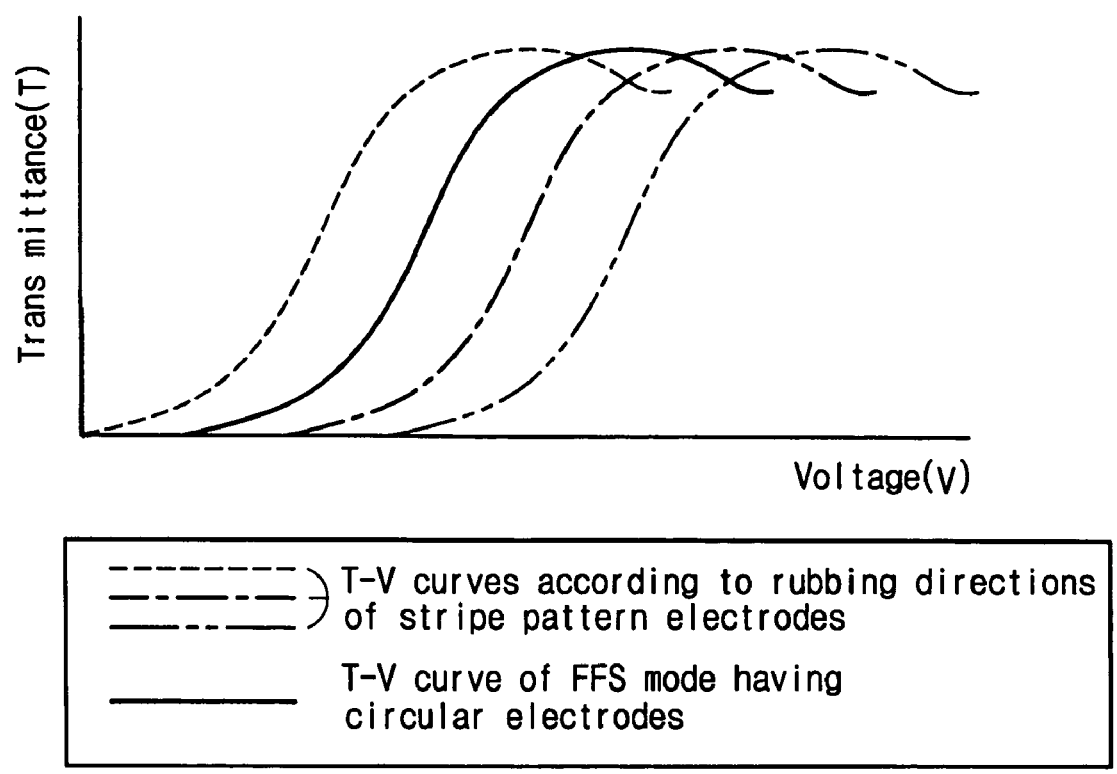

FIG. 4A illustrates an electrode structure of a circular band shape for an FFS mode LCD device according to the present invention, and shows movement of liquid crystal molecules in each domain. FIG. 4B is a graph showing transmittance-voltage (T-V) characteristics of the FFS mode having the electrode of the circular band shape. The electrode structure includes a plurality of circular bands, which are concentric and have different sizes.

In the circular band electrodes CE of FIG. 4A, there exists a multi-domain structure including 4 domains D1, D2, D3 and D4 having different arrangements of liquid crystal molecules 110. When voltage is not applied, the liquid crystal molecules 110 of every domain are arranged dependent on the rubbing direction of the alignment layer, for example, along directions of 90 degrees and −270 degrees. When voltage is applied, a lateral electric field parallel to substrates (not shown) is induced, and the liquid crystal molecules 110 are arranged to align with the circular band electrodes CE by the lateral electric field. Thus, the arranged liquid crystal molecules 110 have a radial shape.

In FIG. 4B, transmission-voltage characteristics of the FFS mode having the circular band electrodes are expressed by the sum of the effects of the rubbing directions of the related art stripe pattern electrodes.

Embodiments for an FFS mode LCD device having circular band electrodes of the present invention, hereinafter, will be explained in detail with reference to the attached drawings.

Figure 5:
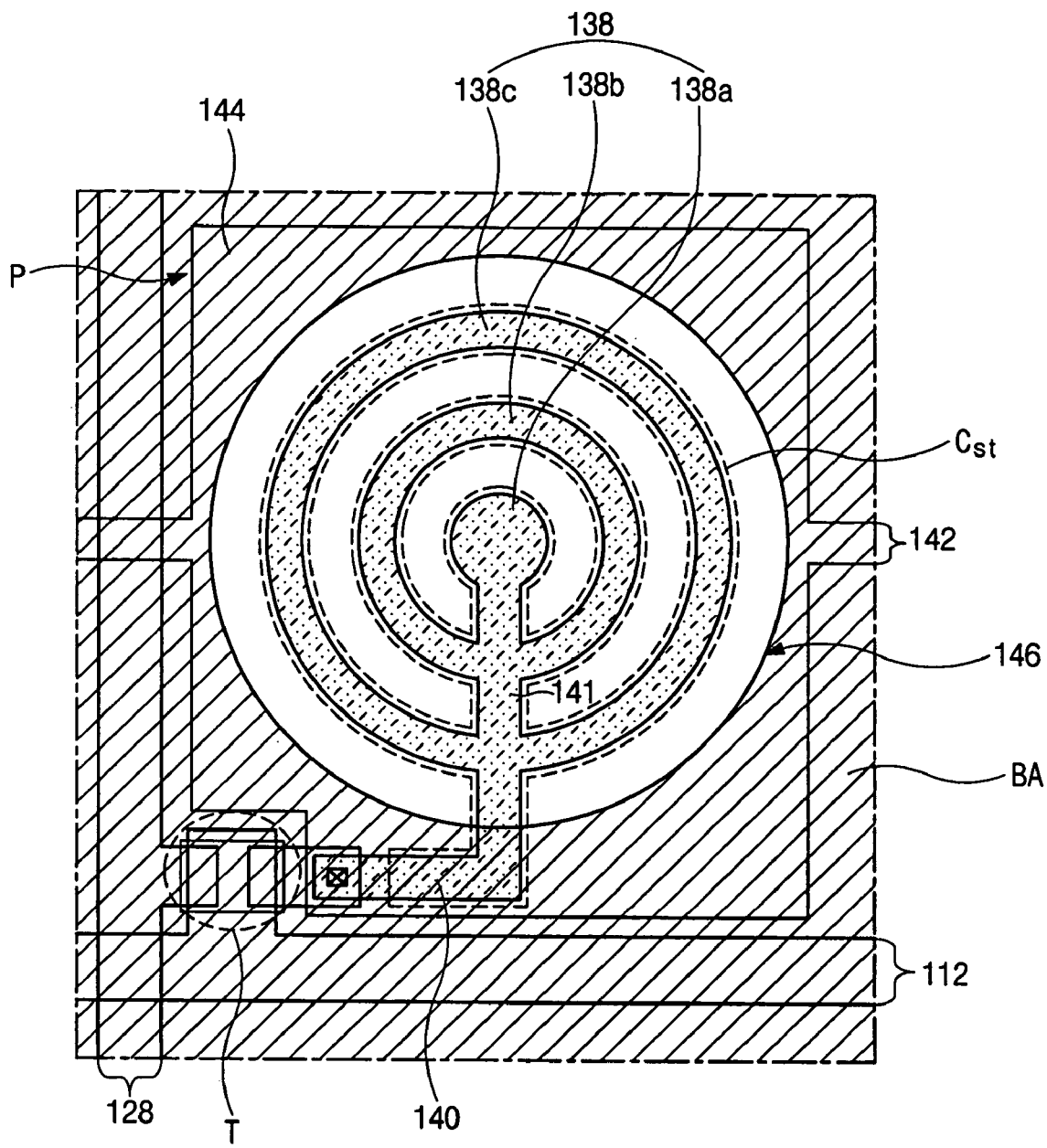
FIG. 5 is a plan view of an FFS mode LCD device according to a first embodiment of the present invention.

FIG. 5 is a plan view of an FFS mode LCD device according to a first embodiment of the present invention. As shown in FIG. 5, a gate line 112 is formed in a first direction, and a data line 128 is formed in a second direction crossing the first direction. A common line 142 is formed in the first direction. The gate line 112 and the data line 128 cross each other to define a pixel region P. In the pixel region P, a common electrode 144 of a substantially square shape is connected to the common line 142.

A thin film transistor T is formed at a crossing of the gate line 112 and the data line 128, and a first pixel connecting line 140 is connected to the thin film transistor T. A second pixel connecting line 141 extends from the first pixel connecting line 140 along the second direction. A pixel electrode 138 including a plurality of circular band patterns diverges from the second pixel connecting line 141. The pixel electrode 138 includes first, second and third pixel electrode patterns 138a, 138b, and 138c, which are concentric and have different sizes, from the center to the outermost electrode.

In the FFS mode LCD device shown, spaces between the patterns of the pixel electrode 138 and an overlapping portion of the pixel electrode 138 and the common electrode 144 are used as an aperture area. Therefore, the pixel electrode 138 and the common electrode 144 are made of a transparent conductive material such as indium tin oxide (ITO).

Although an additional storage capacitor is not formed, the overlapping portion of the pixel electrode 138 and 144 serves as a storage capacitor Cst with an insulating layer (not shown) interposed therebetween.

In FIG. 5, a hatched region corresponds to a black matrix forming area BA, and a black matrix may be formed on the substrate including the electrodes or on an opposite substrate to prevent light from impinging on an area in which the liquid crystal molecules are not driven. The black matrix forming area BA includes an opening 146 exposing the pixel region P and covers a non-pixel region and an edge of the common electrode 144. The opening 146 has a circular shape larger than the third pixel electrode pattern 138c.

FIGS. 6A to 6F illustrate a manufacturing method of an array substrate for the FFS mode LCD device according to the first embodiment of the present invention. The array substrate is manufactured through 6 mask processes, which include a photolithographic process using photoresist and patterning layers.

Figure 6A:
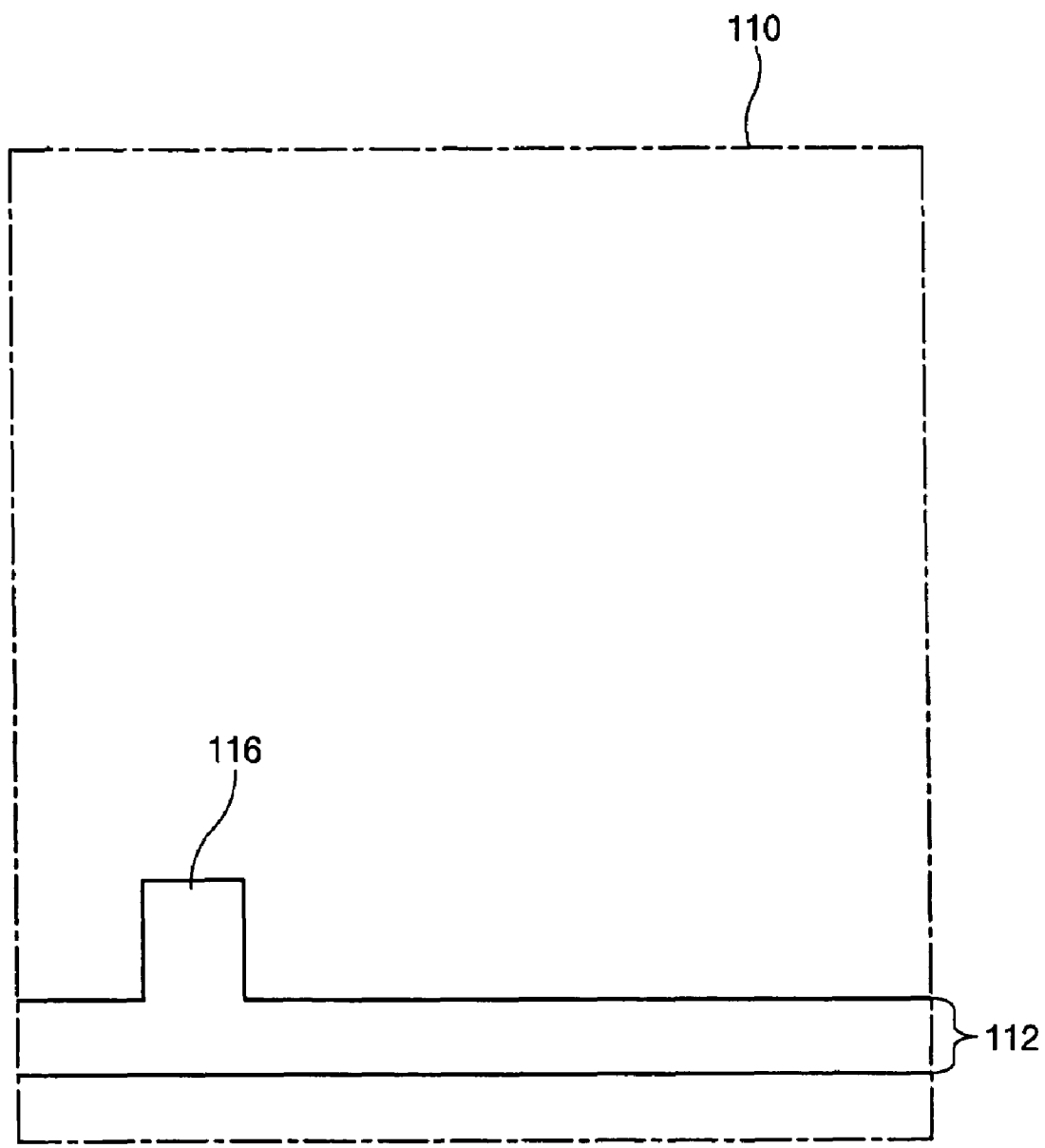
FIGS. 6A to 6F are plan views illustrating a manufacturing method of an array substrate for the FFS mode LCD device according to the first embodiment of the present invention.

In FIG. 6A, a gate line 112 including a gate electrode 116 is formed in a first direction on a substrate 110 through a first mask process.

Figure 6B:
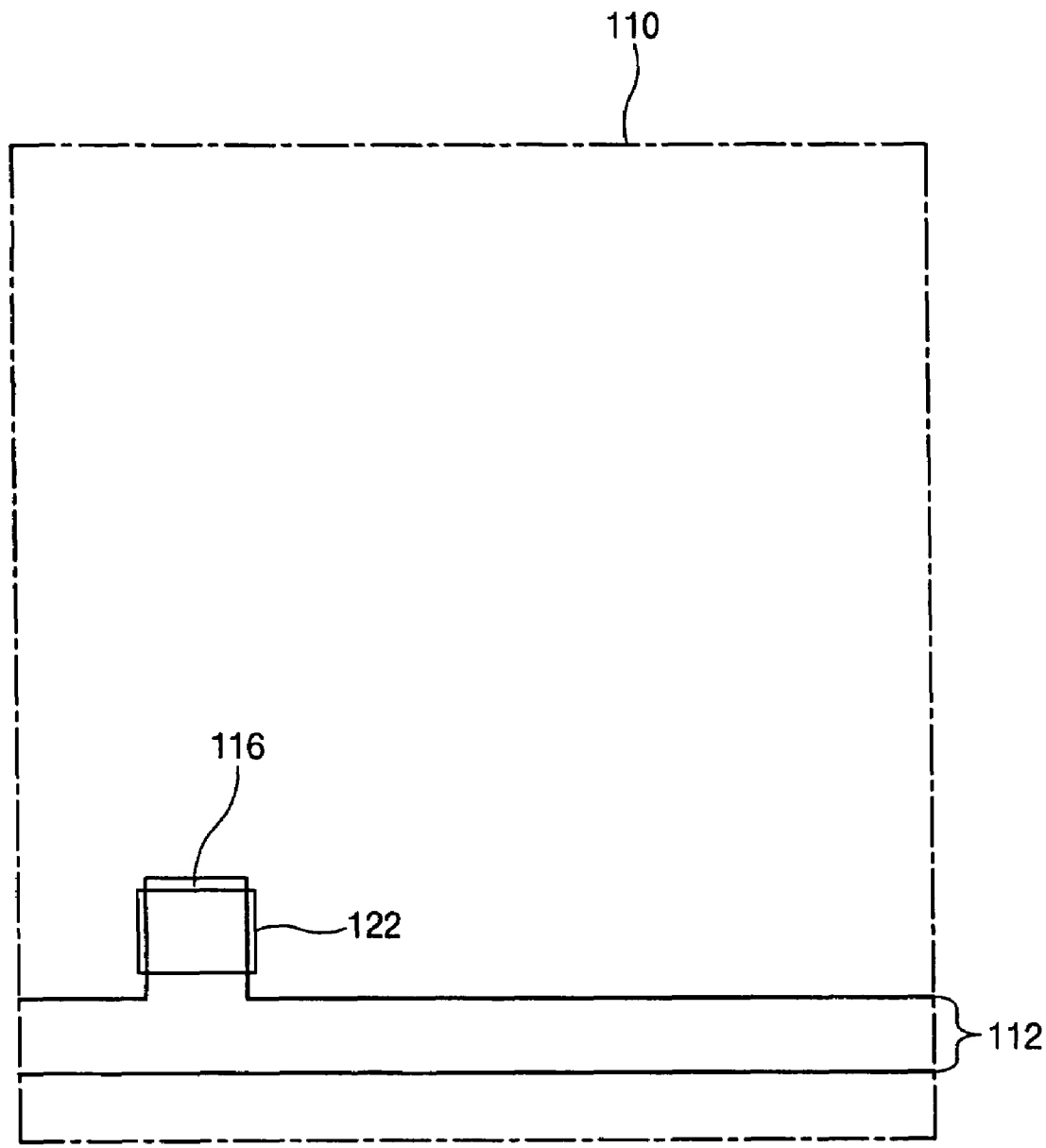

In FIG. 6B, a gate insulating layer (not shown) is formed over the gate line 112, and a semiconductor layer 122 is formed on the gate insulating layer over the gate line 112 through a second mask process.

Figure 6C:
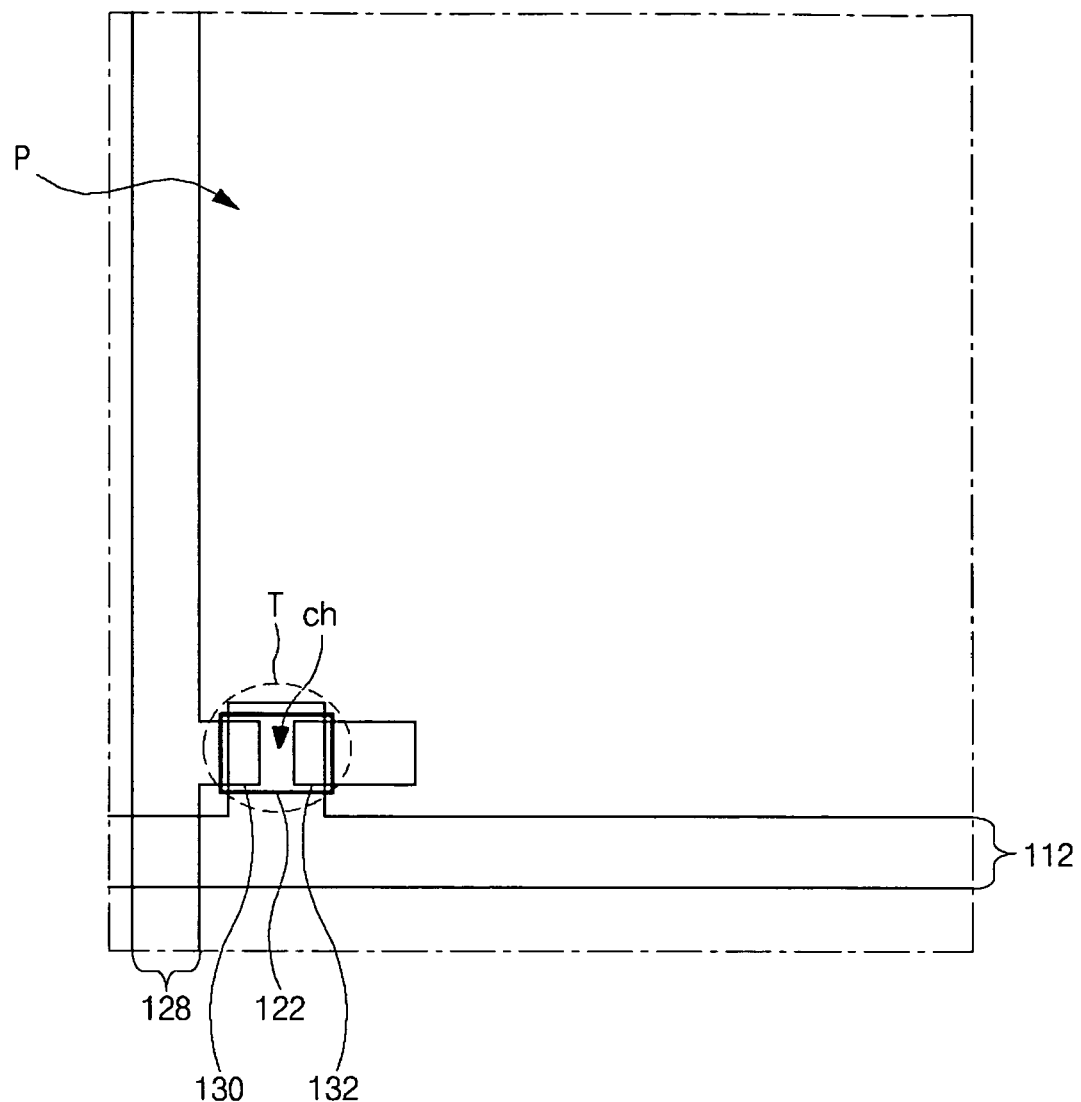

In FIG. 6C, a data line 128, a source electrode 130 and a drain electrode 132 are formed on the substrate 110 including the semiconductor layer 122 through a third mask process. The data line 128 is formed in a second direction crossing the first direction, the source electrode 130 extends from the data line 128, and the drain electrode 132 of an island pattern is spaced apart from the source electrode 130 over the gate electrode 116. The source and drain electrodes 130 and 132 overlap both sides of the semiconductor layer 122. The gate electrode 116, the semiconductor layer 122, the source electrode 130, and the drain electrode 132 form a thin film transistor T. A pixel region P is defined by crossing of the gate line 112 and the data line 128.

The third mask process includes exposing an intrinsic semiconductor material of the semiconductor layer 122 between the source and drain electrodes 130 and 132, and the exposed intrinsic semiconductor material becomes a channel ch of the thin film transistor T.

Figure 6D:
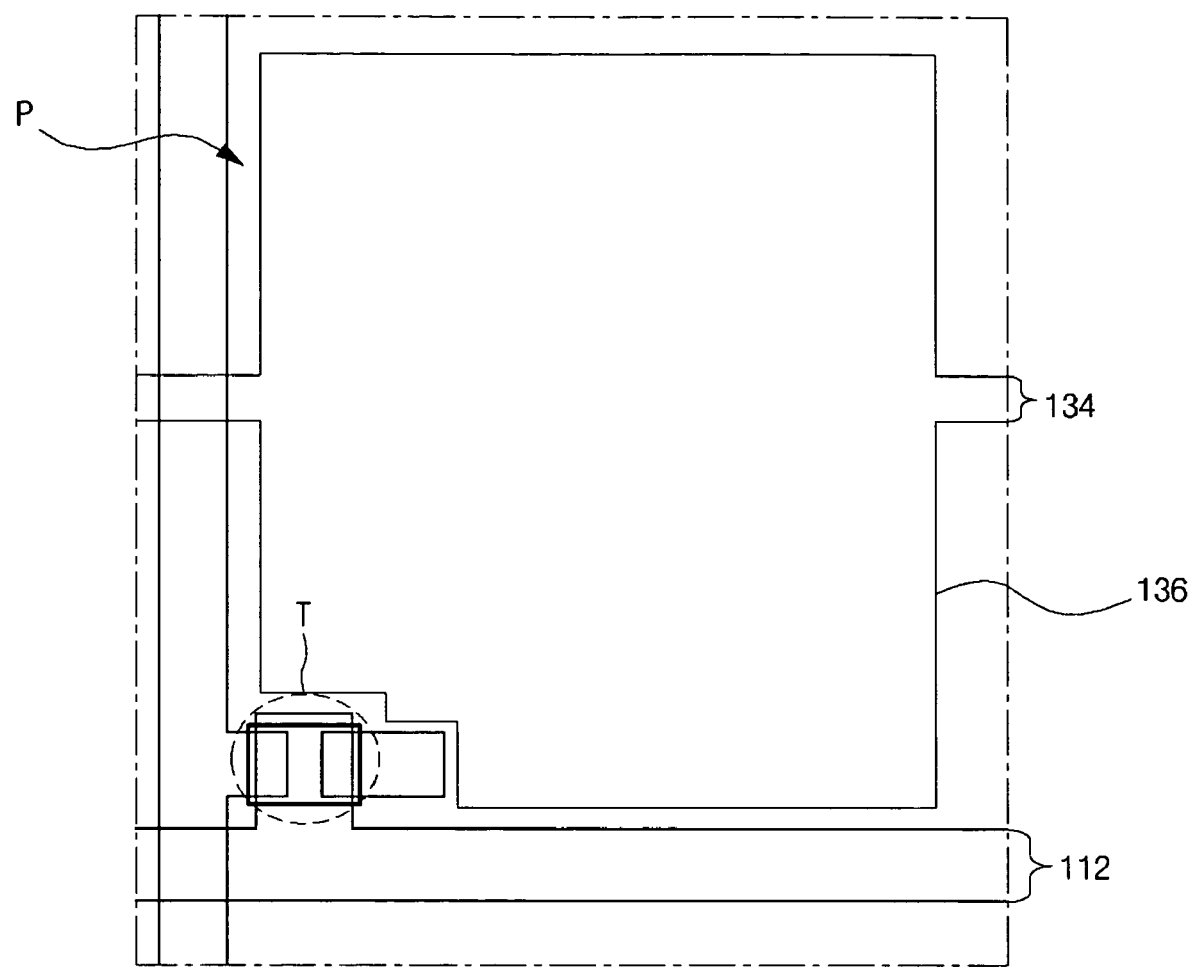

In FIG. 6D, a passivation layer (not shown) is formed on an entire surface of the substrate 110 including the thin film transistor T, and then a common line 134 and a common electrode 136 are formed on the passivation layer through a fourth mask process. The common line 134 is formed in the first direction and spaced apart from the gate line 112. The common electrode 136 is connected to the common line 134, and has a square shape corresponding to the pixel region P.

Figure 6E:
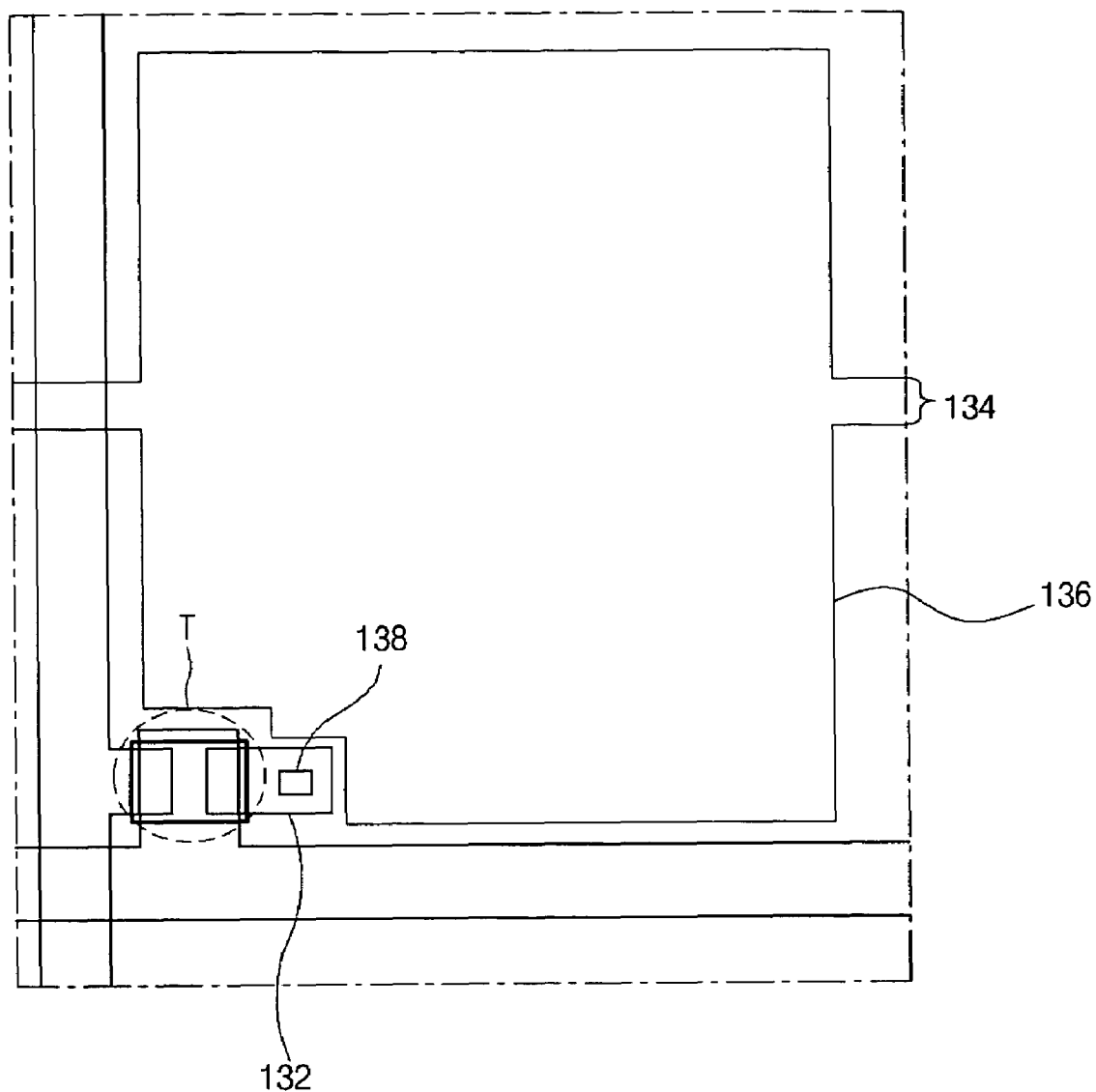

In FIG. 6E, an insulating layer (not shown) is formed on an entire surface of the substrate 110 including the common line 134 and the common electrode 136. Then, the insulating layer and the passivation layer are patterned through a fifth mask process to form a drain contact hole 138 exposing a part of the drain electrode 132.

Figure 6F:
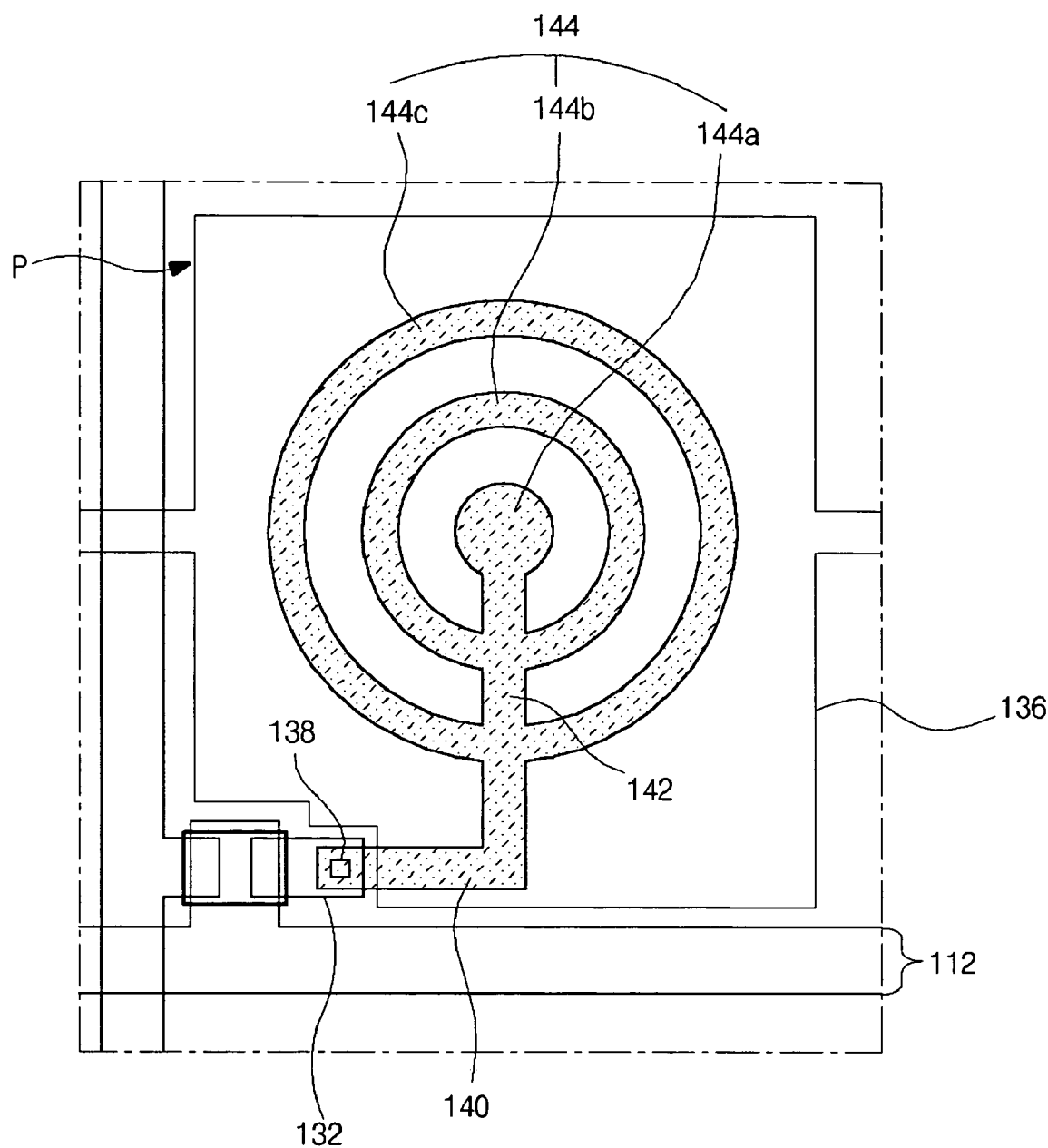

In FIG. 6F, a first pixel connecting line 140, a second pixel connecting line 142 and a pixel electrode 144 are formed through a sixth mask process. The first pixel connecting line 140 is connected to the drain electrode 132 through the drain contact hole 138. The second pixel connecting line 142 extends from the first pixel connecting line 140 along the second direction. The pixel electrode 144 diverges from the second pixel connecting line 142 and includes a plurality of circular or circular band patterns, which have different sizes and are concentric spaced apart from each other. More particularly, the pixel electrode 144 is composed of a first pixel electrode pattern 144a of a circular shape in the center, a second pixel electrode pattern 144b of a circular band shape outside the first pixel electrode pattern 144a, and a third pixel electrode pattern 144c of a circular band shape outside the second pixel electrode pattern 144b. The pixel electrode 144 overlaps the common electrode 136.

FIGS. 7A to 7E illustrate a manufacturing method of an array substrate for an FFS mode LCD device according to a second embodiment of the present invention. The second embodiment uses a smaller number of mask processes than the first embodiment. Explanations for repeated processes may be shortened.

Figure 7A:
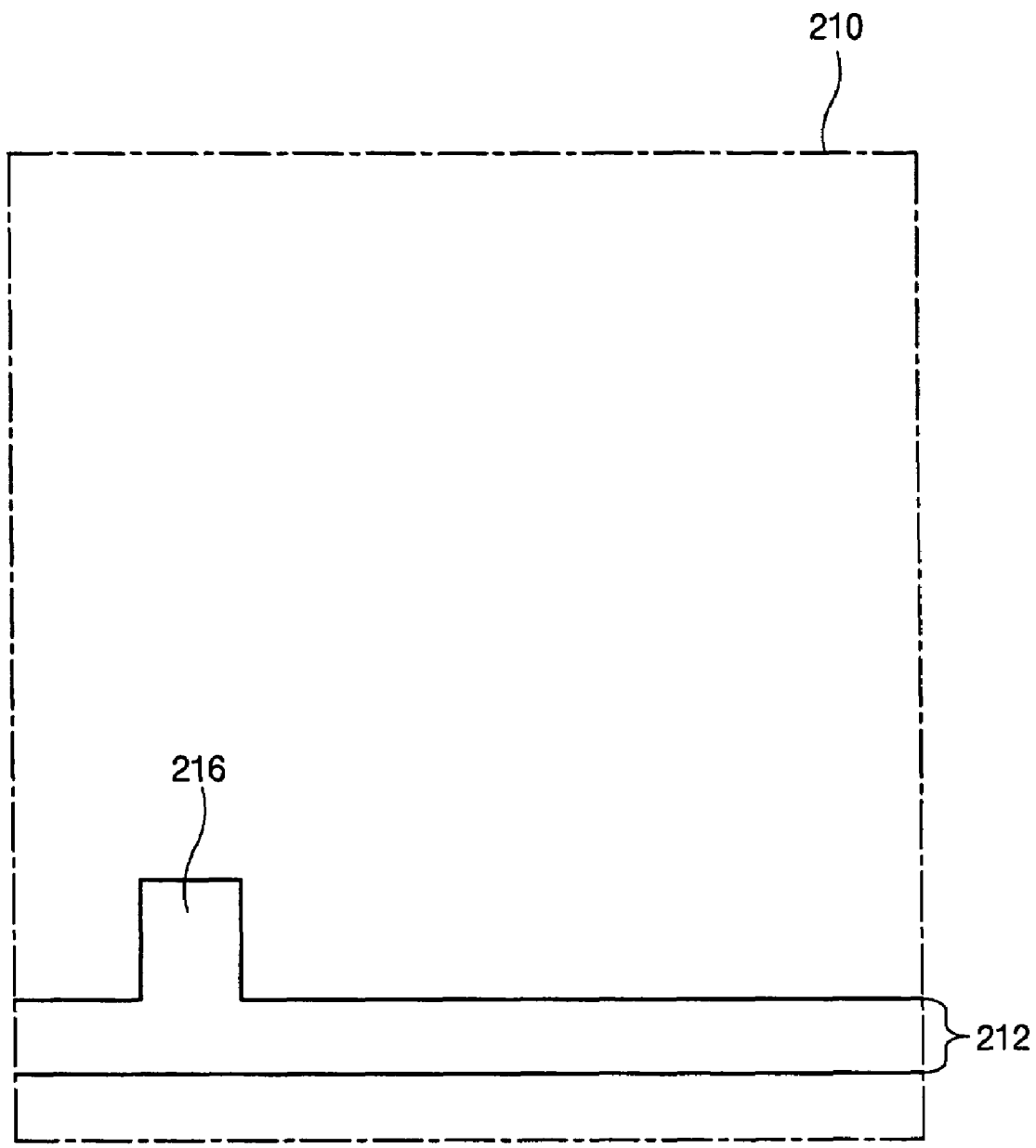
FIGS. 7A to 7E are plan views illustrating a manufacturing method of an array substrate for an FFS mode LCD device according to a second embodiment of the present invention.

In FIG. 7A, a gate line 212 and a gate electrode 216 are formed on a substrate 210 through a first mask process.

Figure 7B:
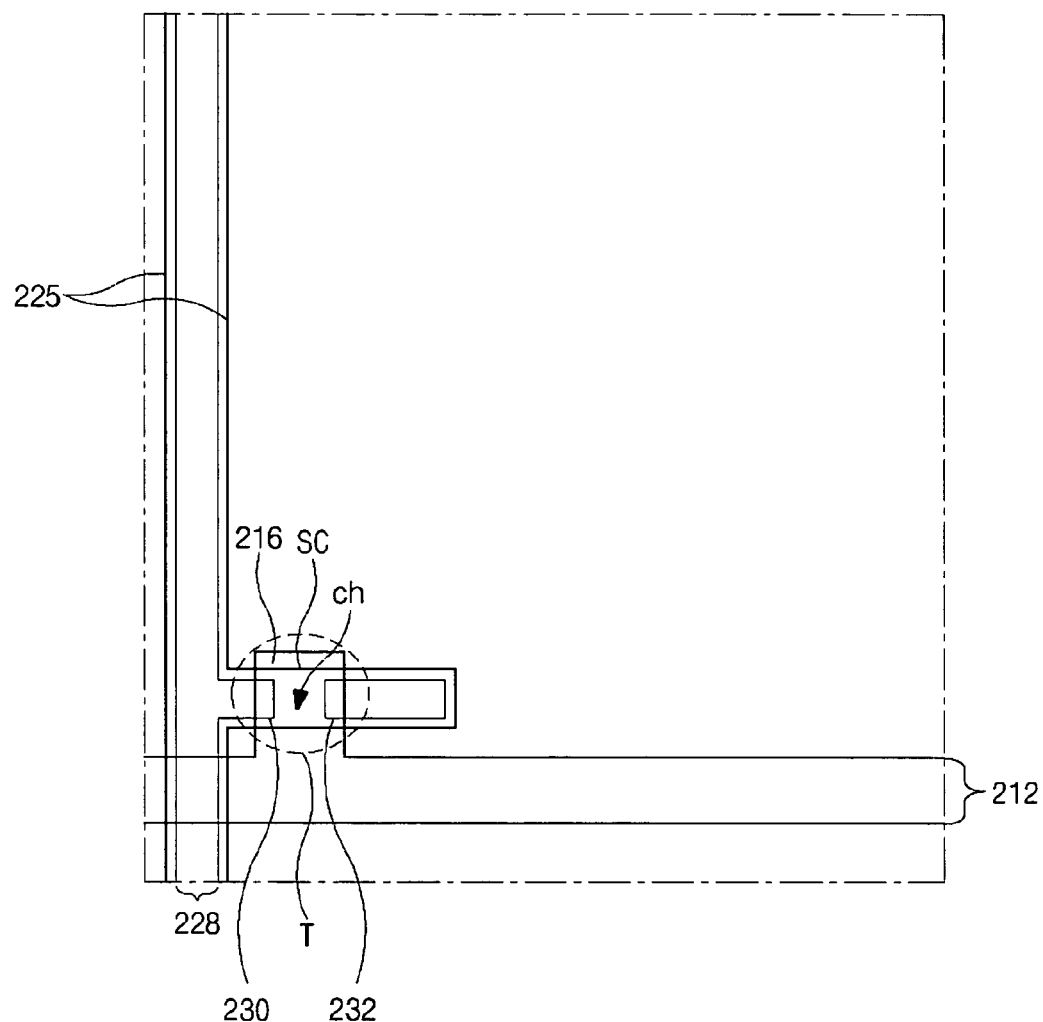

In FIG. 7B, a gate insulating layer (not shown) is formed over the gate line 212 and the gate electrode 216, and a semiconductor material and a metal material are sequentially deposited on the gate insulating layer. The semiconductor material and the metal material are patterned through a second mask process including a diffraction exposing method to thereby form a data line 228, a source electrode 230, a drain electrode 232, and a semiconductor material layer 225. The semiconductor material layer 225 has the same shape as the data line 228, the source electrode 230 and the drain electrode 232, and has an additional portion between the source electrode 230 and the drain electrode 232. The semiconductor material layer 225 corresponding to the source electrode 230 and the drain electrode 232 is a semiconductor area SC, which serves as an active area. The gate electrode 216, the semiconductor area SC of the semiconductor material layer 225, the source electrode 230 and the drain electrode 232 constitute a thin film transistor T.

The second mask process includes exposing an intrinsic semiconductor area of the semiconductor material layer 225 between the source electrode 230 and the drain electrode 232 by the diffraction exposing method. The exposed intrinsic semiconductor area becomes a channel ch of the thin film transistor T.

For example, a mask including a slit portion corresponding to a channel area is disposed and is exposed, whereby a photoresist layer having a thinner thickness in the channel area than in source/drain pattern areas is formed. The semiconductor material layer 225 and the source and drain electrodes 230 and 232 are simultaneously formed through one mask process. The photoresist layer may be formed from a positive photoresist in which a portion of the photoresist layer exposed to light is developed and removed.

Figure 7C:
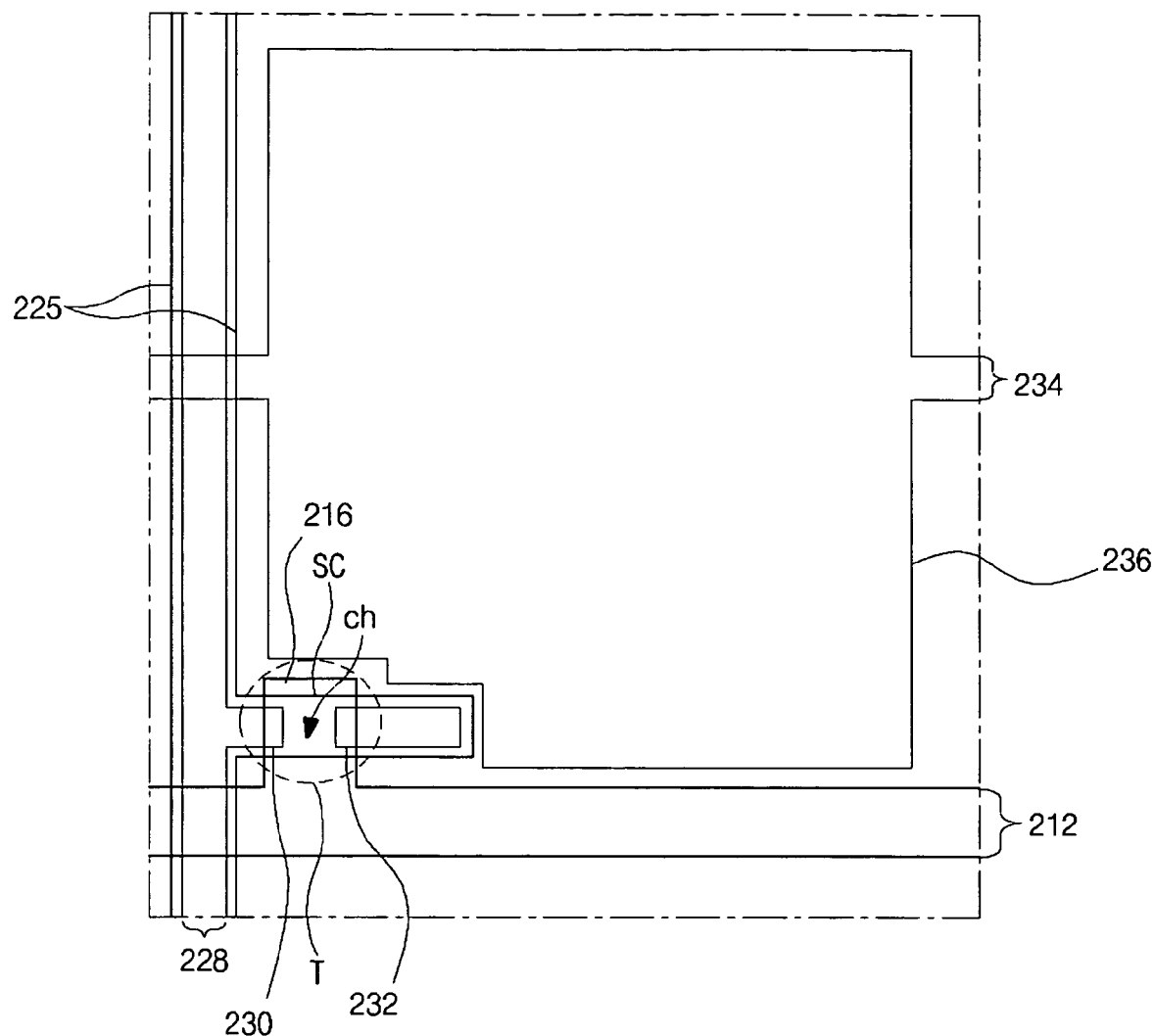

In FIG. 7C, a passivation layer (not shown) is formed on an entire surface of the substrate 210 including the thin film transistor T, and then a common line 234 and a common electrode 236 are formed on the passivation layer through a third mask process. The common line 234 and the common electrode 236 may be formed of a transparent conductive material such as ITO.

Figure 7D:
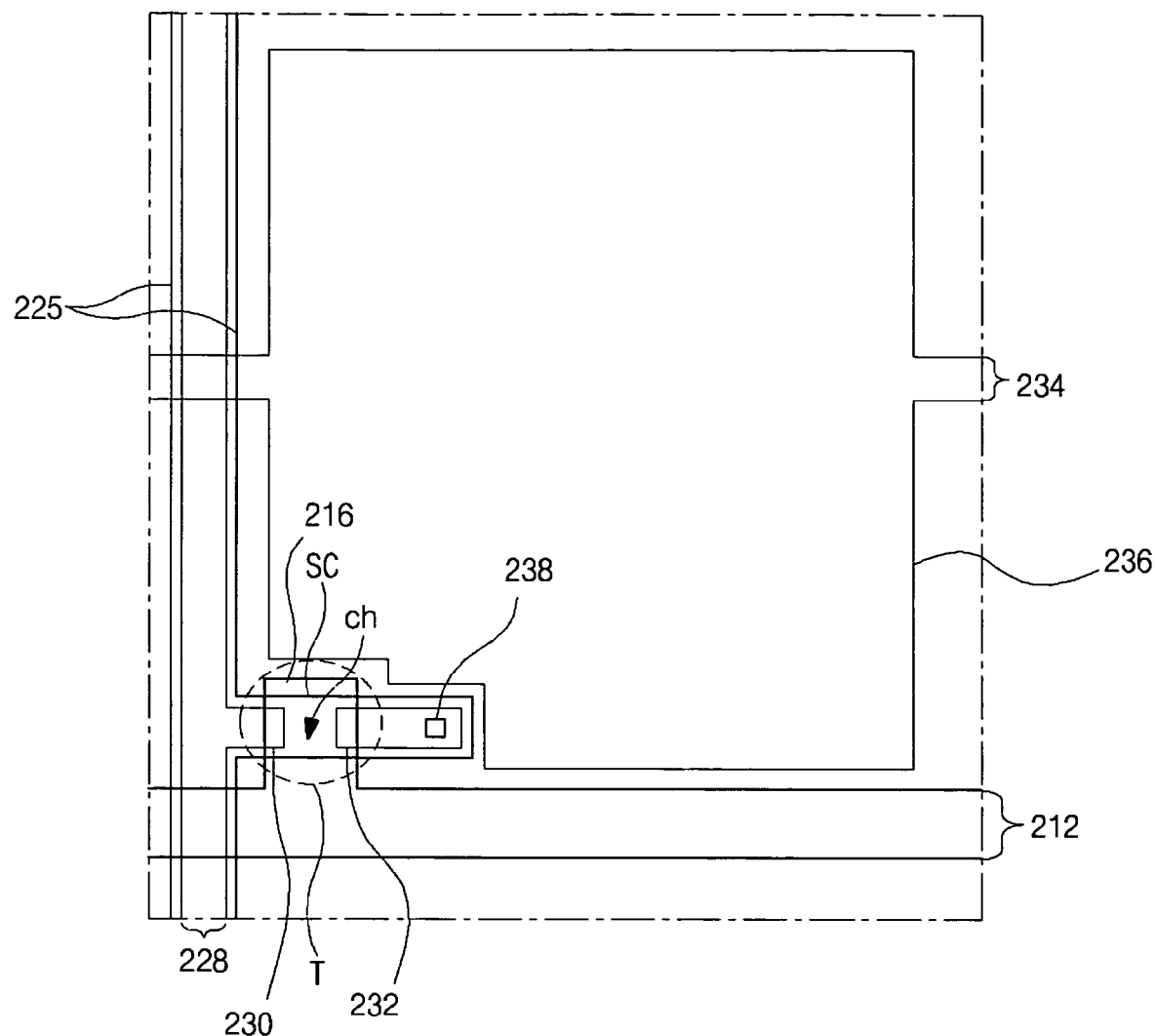

In FIG. 7D, an insulating layer (not shown) is formed on the common line 234 and the common electrode 236, and then the insulating layer and the passivation layer are patterned through a fourth mask process to form a drain contact hole 238 exposing a part of the drain electrode 232.

Figure 7E:
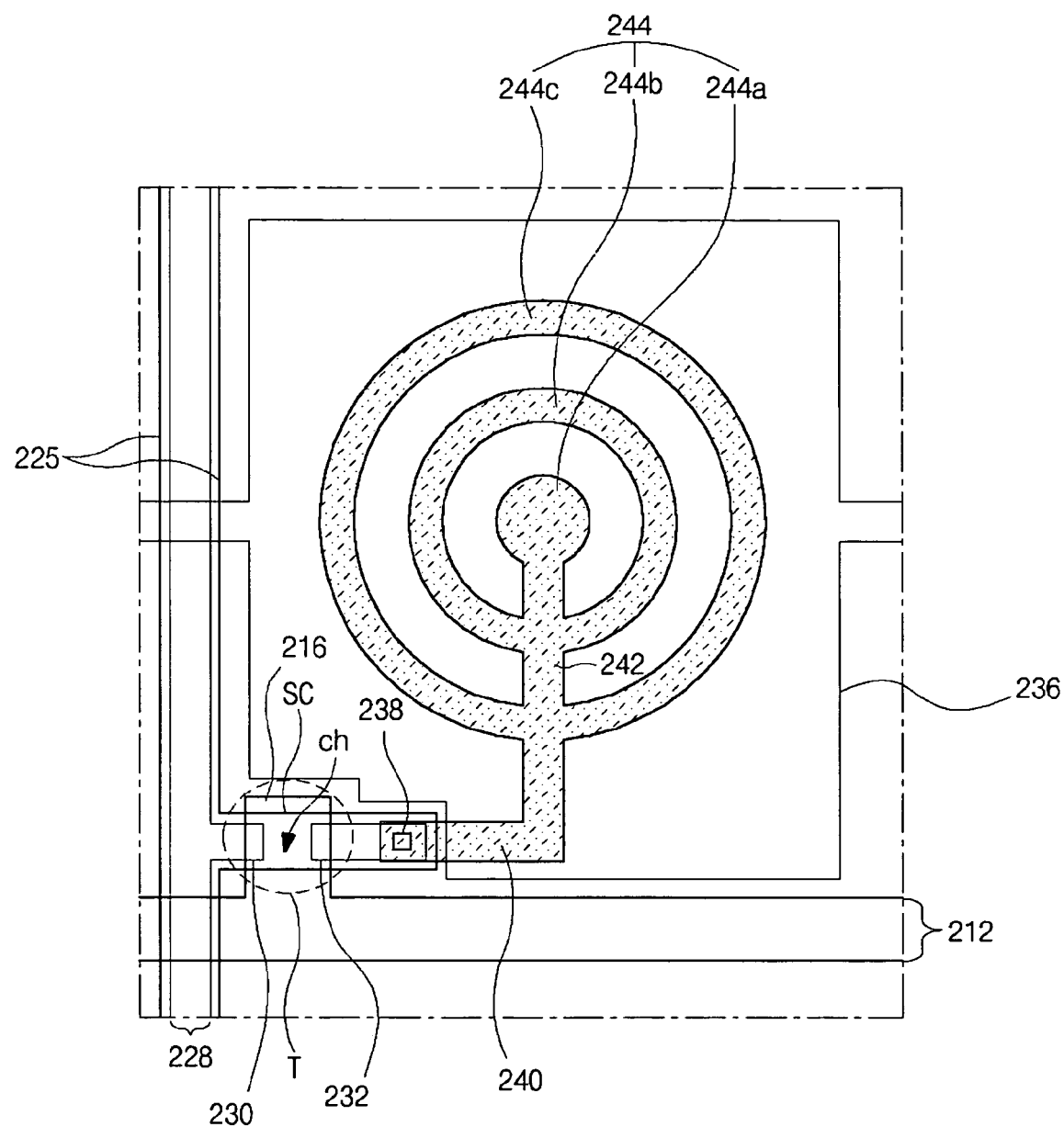

In FIG. 7E, a first pixel connecting line 240, a second pixel connecting line 242 and a pixel electrode 244 are formed on the insulating layer including the drain contact hole 238 through a fifth mask process. The first pixel connecting line 240 is connected to the drain electrode 232 through the drain contact hole 238, the second pixel connecting line 242 extends from the first pixel connecting line 240, and the pixel electrode 244 diverges from the second pixel connecting line 242. The pixel electrode 244 includes a plurality of patterns, which may have the same shapes as the first embodiment of FIG. 6E. That is, the pixel electrode 244 may be composed of first, second and third pixel electrode patterns 244a, 244b and 244c. The pixel electrode 244 may be made of a transparent conductive material such as ITO.

In another embodiment, the pixel electrode may have a spiral shape.

Figure 8:
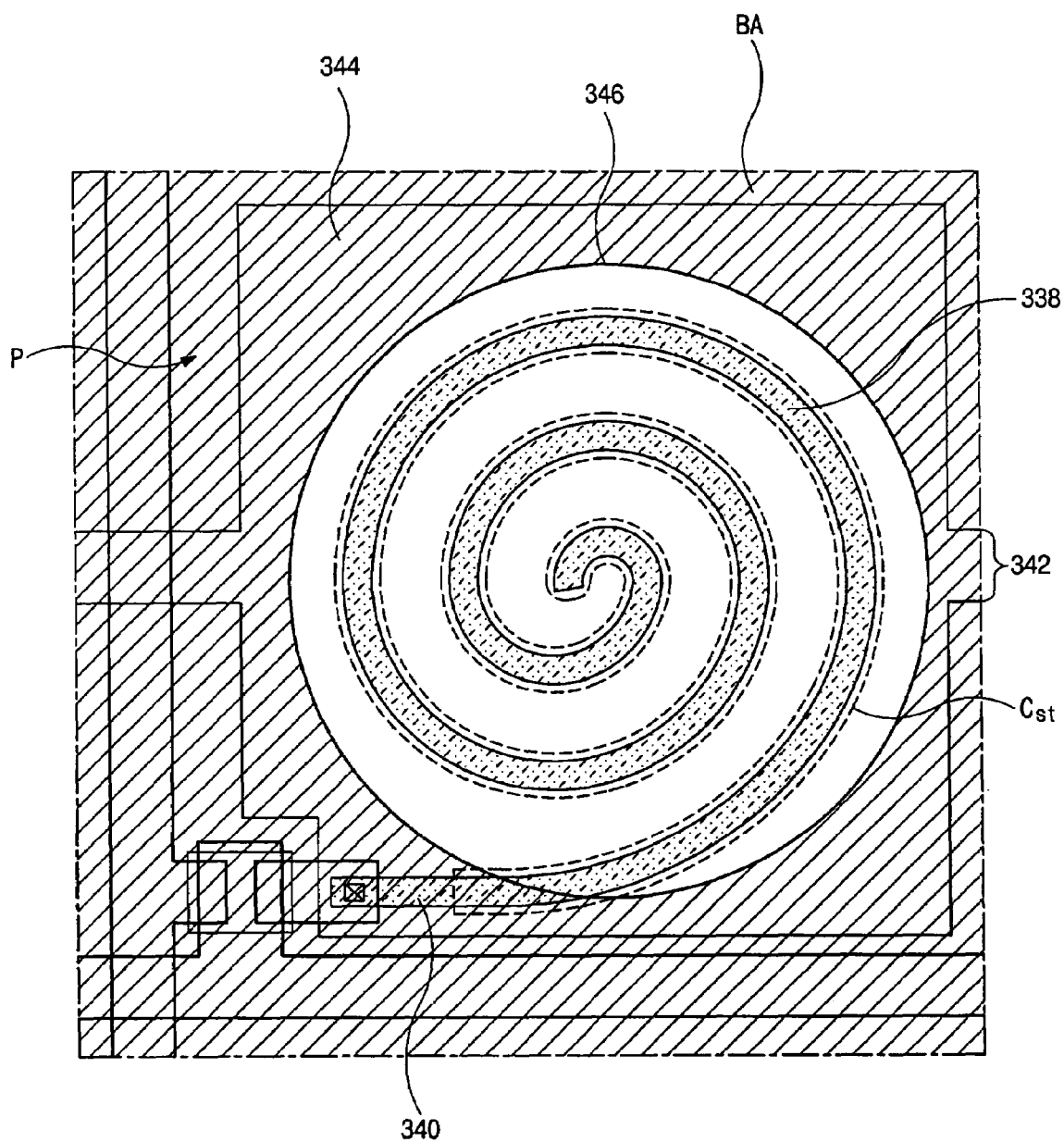
FIG. 8 is a plan view of an FFS mode LCD device according to a third embodiment of the present invention.

FIG. 8 is a plan view of an FFS mode LCD device according to a third embodiment of the present invention. The third embodiment has the same structure as the first embodiment except for the electrode structure of the circular band shape. Thus, explanations for the same parts as the first embodiment may be omitted.

As shown in FIG. 8, a square shaped common electrode 344 is formed in a pixel region P, and is connected to a common line 342. The common electrode 344 is connected to an adjacent common electrode in a neighbor pixel region (not shown) through the common line 342. A pixel connecting line 340 is connected to the thin film transistor T, and a pixel electrode 338 extends from the pixel connecting line 340. The pixel electrode 338 has a spiral shape and overlaps the common electrode 344.

In this embodiment, liquid crystal molecules in spaces formed by the spiral pattern of the pixel electrode 338 are driven by a lateral electric field between the pixel electrode 338 and the common electrode 344. The liquid crystal molecules in an overlapping portion of the pixel electrode 338 and the common electrode 344 are also driven, and transmit light. Thus, the pixel electrode 338 and the common electrode 344 are formed of a transparent conductive material such as ITO. The overlapping portion of the pixel electrode 338 and the common electrode 344 forms a storage capacitor Cst with an insulating layer interposed therebetween.

In FIG. 8, a hatched region corresponds to a black matrix forming area BA. The black matrix forming area BA has an opening 346 exposing the pixel electrode 338.

Figure 9A:
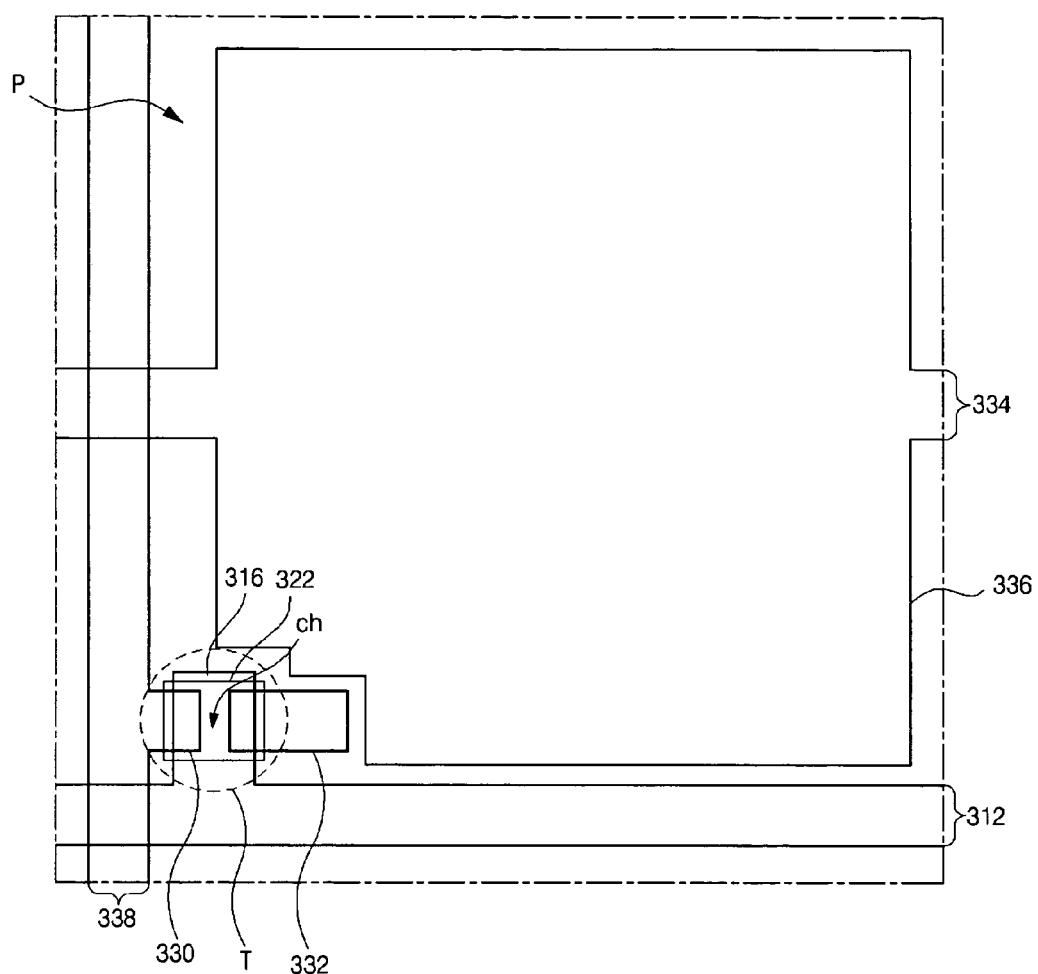
FIGS. 9A to 9C are plan views illustrating a manufacturing method of an array substrate for the FFS mode LCD device according to the third embodiment of the present invention.
Figure 9B:
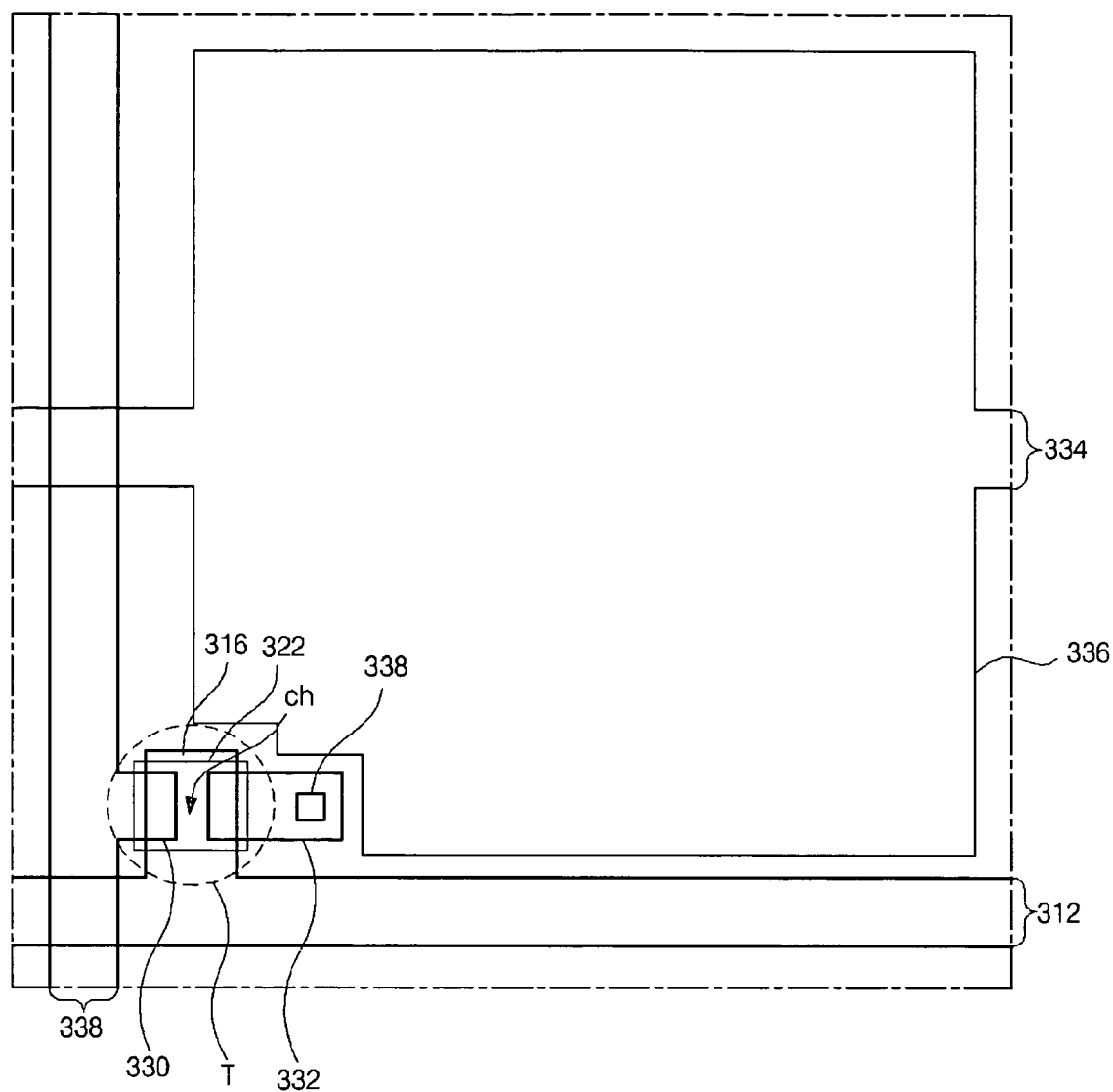
Figure 9C:
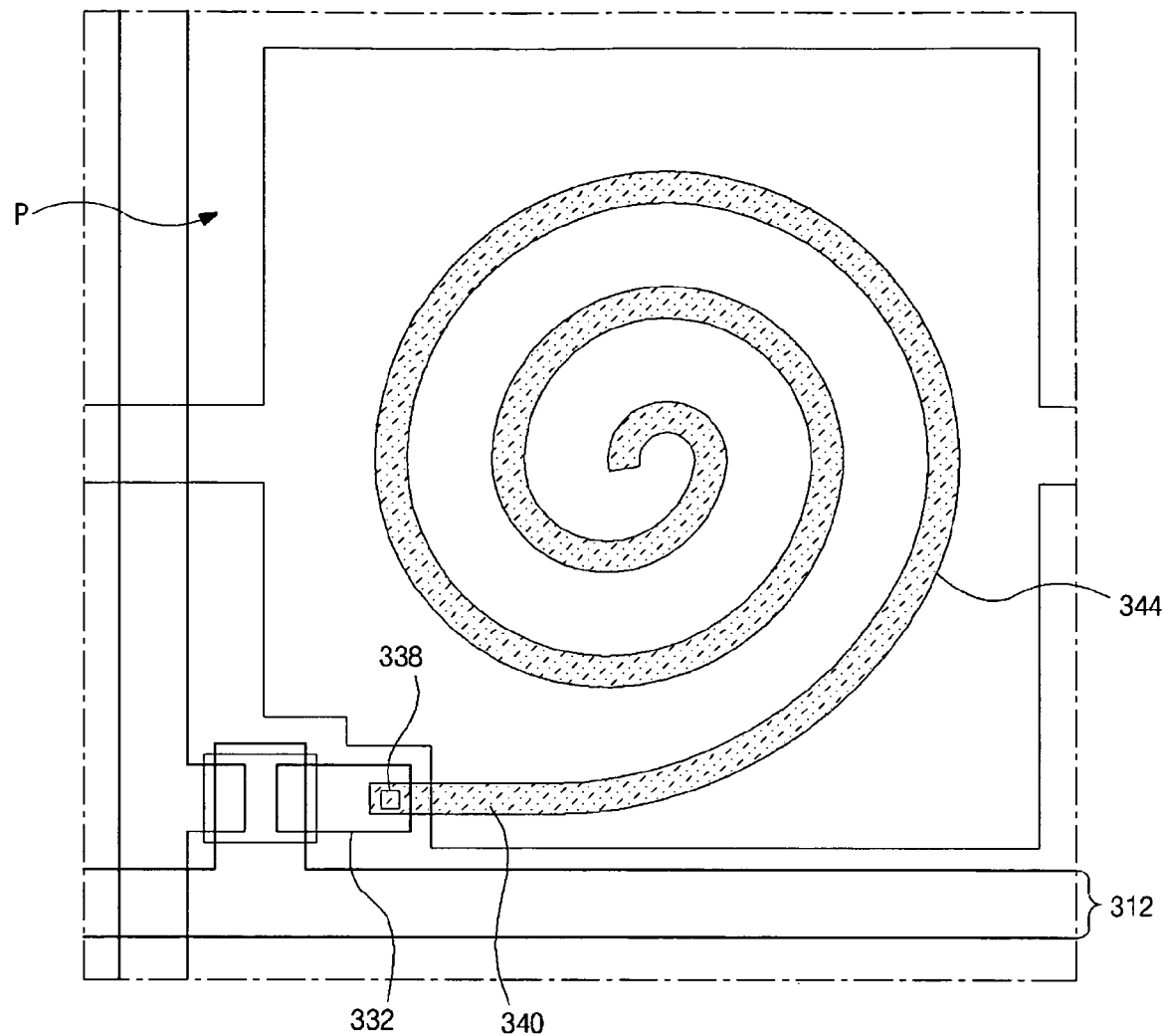

FIGS. 9A to 9C illustrate a manufacturing method of an array substrate for the FFS mode LCD device according to the third embodiment of the present invention. In the third embodiment, first to fourth mask processes are the same as the first embodiment.

In FIG. 9A, a gate line 312 and a gate electrode 316 are formed through a first mask process. A semiconductor layer 322 is formed over the gate line 312 and the gate electrode 316 through a second mask process, and then a data line 328, a source electrode 330 and a drain electrode 332 are formed through a third mask process. The gate electrode 316, the semiconductor layer 322, the source electrode 330 and the drain electrode 332 constitute a thin film transistor T. An intrinsic semiconductor portion is exposed by using the source and drain electrodes 330 and 332, and the exposed intrinsic semiconductor portion becomes a channel ch of the thin film transistor T.

Next, a passivation layer (not shown) is formed on an entire surface of a substrate including the thin film transistor T, and a common line 334 and a common electrode 336 are formed on the passivation layer through a fourth mask process. The common line 334 is parallel to the gate line 312, and the common electrode 336 connected to the common line 334 has a square shape corresponding to a pixel region P.

In FIG. 9B, an insulating layer (not shown) is formed on an entire surface of the substrate including the common electrode 336 and the common line 334, and then the insulating layer and the passivation layer are patterned through a fifth mask process to form a drain contact hole 338 exposing a part of the drain electrode 332.

In FIG. 9C, a pixel connecting line 340 and a pixel electrode 344 are formed on the insulating layer including the drain electrode 338 through a sixth mask process. The pixel connecting line 340 is connected to the drain electrode 332 through the drain contact hole 338. The pixel electrode 344 extends from the pixel connecting line 340 and has a spiral shape.

Figure 10A:
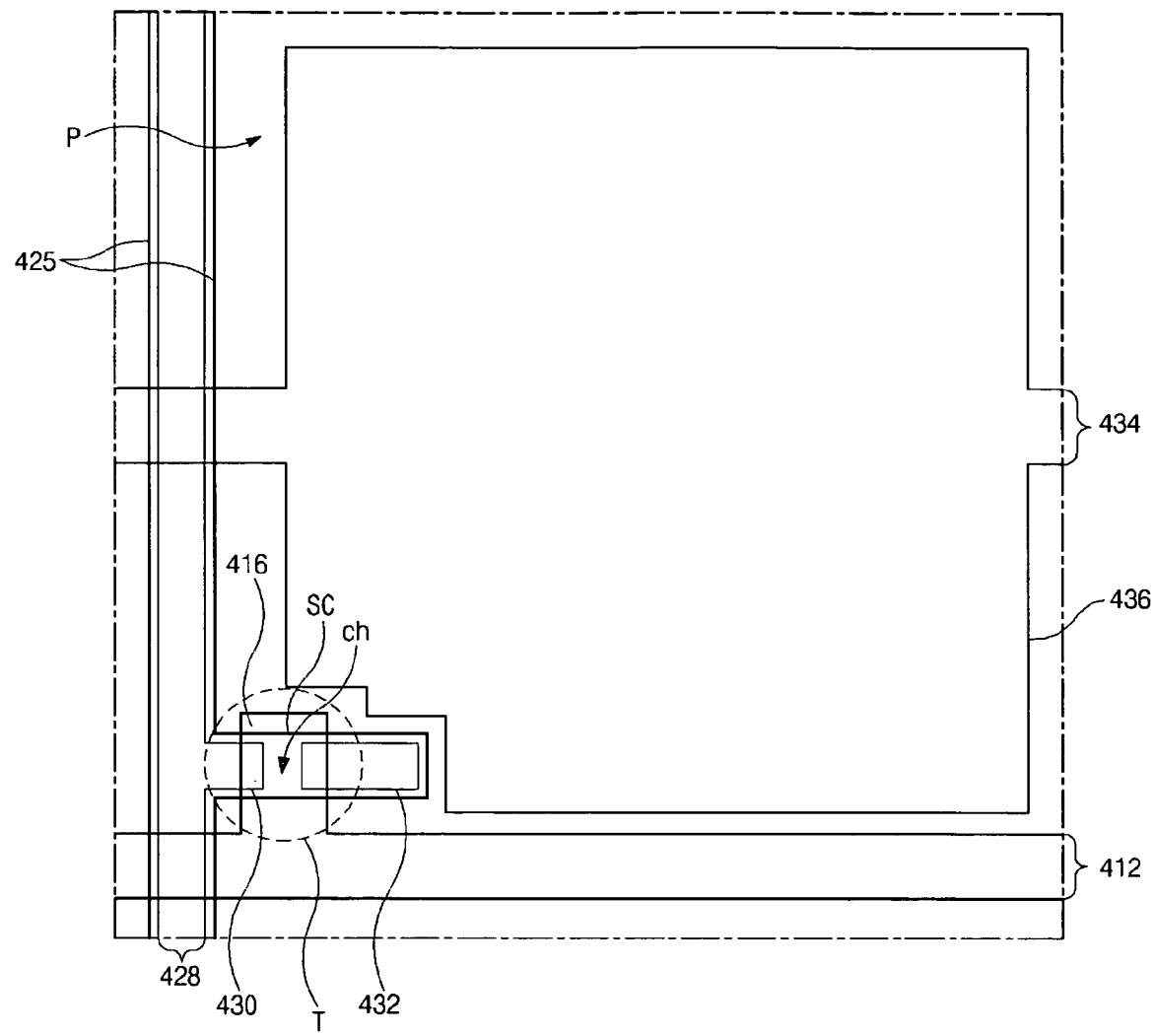
FIGS. 10A to 10C are plan views illustrating a manufacturing method of an array substrate for an FFS mode LCD device according to a fourth embodiment of the present invention.
Figure 10B:
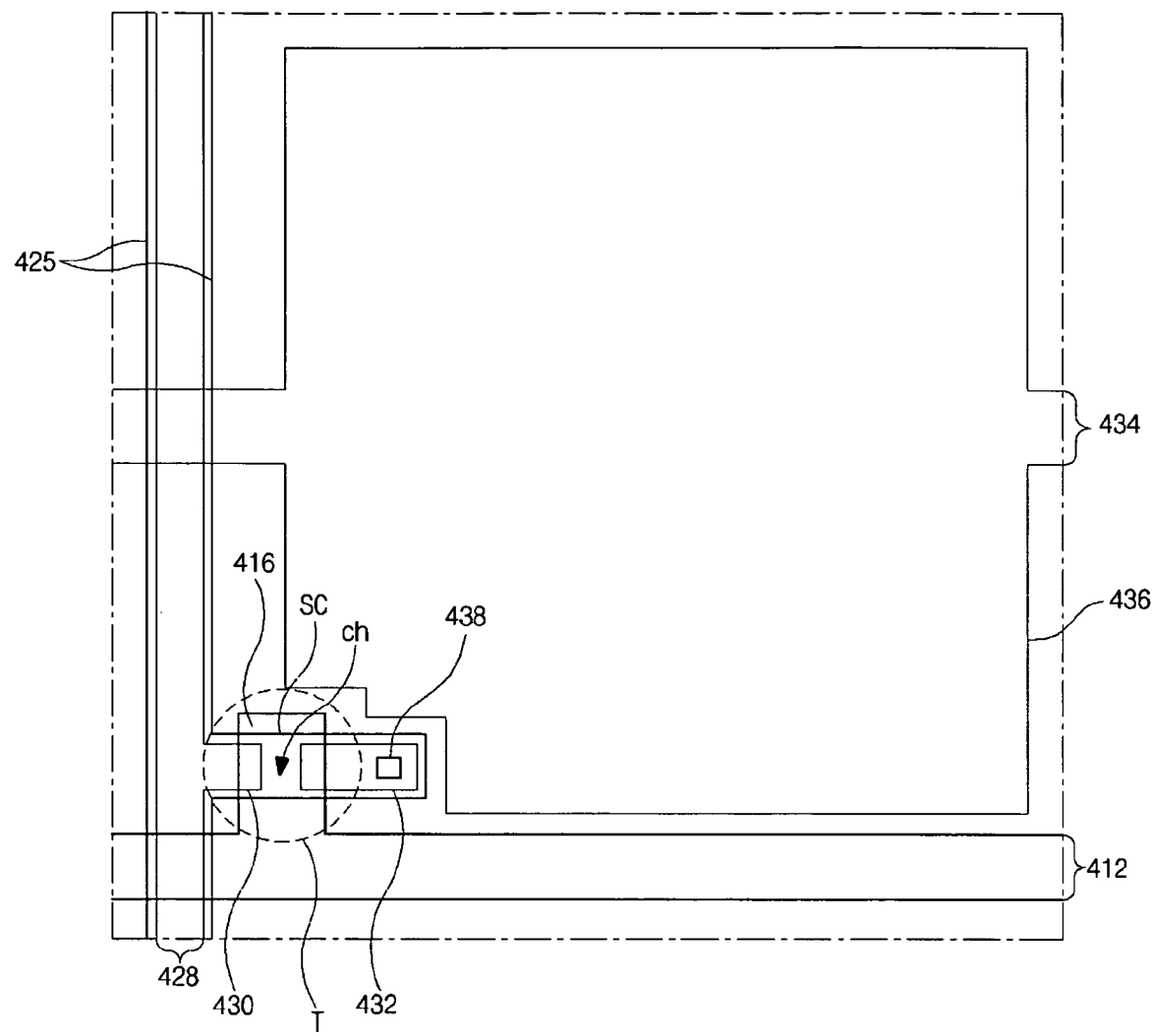
Figure 10C:
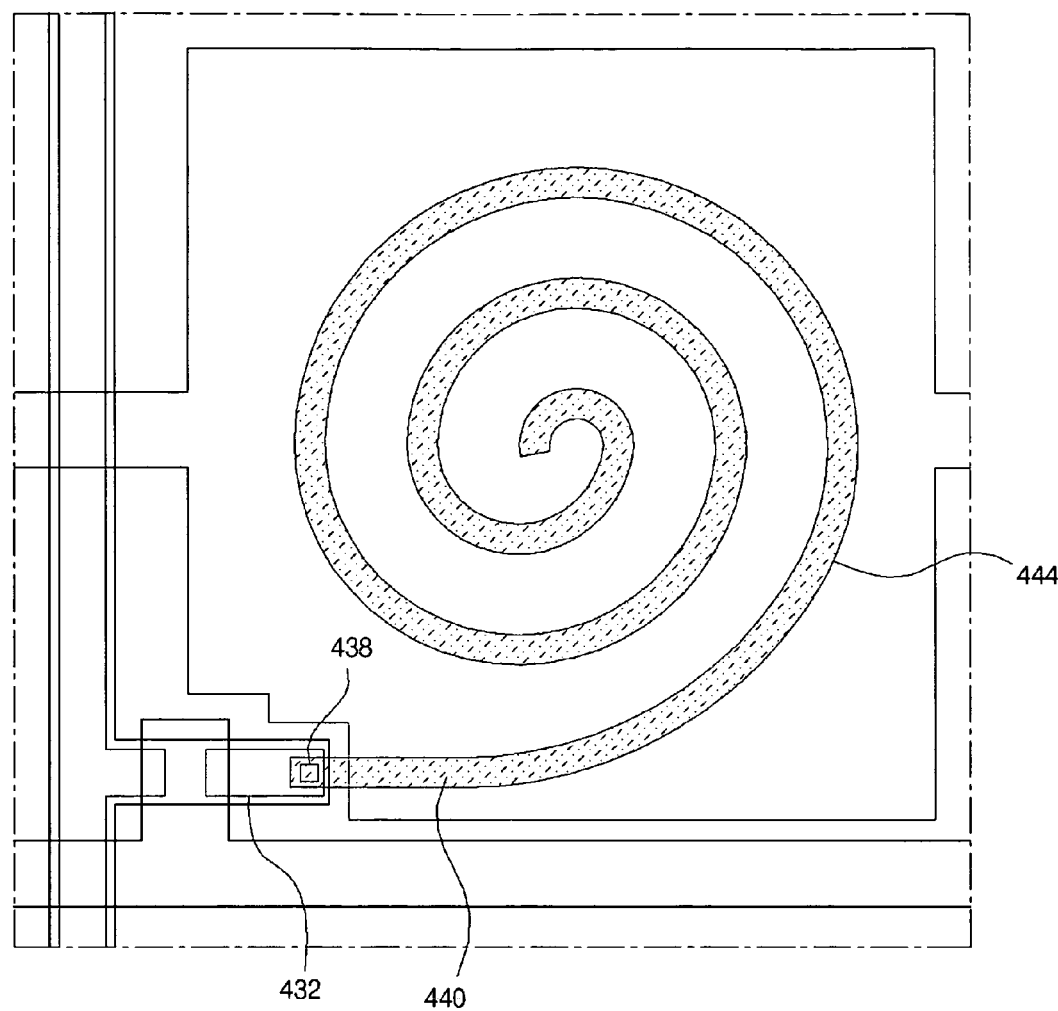

FIGS. 10A to 10C illustrate a manufacturing method of an array substrate for an FFS mode LCD device according to a fourth embodiment of the present invention. The fourth embodiment has the smaller number of mask processes than the third embodiment.

In FIG. 10A, a gate line 412 and a gate electrode 416 are formed through a first mask process. A data line 428, a source electrode 430, a drain electrode 432, and a semiconductor material layer 425 are formed through a second mask process using a diffraction exposing method. The semiconductor material 425 has the same shape as the data line 428, the source electrode 430 and the drain electrode 432, and has an additional portion between the source and drain electrodes 430 and 432. The semiconductor material layer 425 corresponding to the source and drain electrodes 430 and 432 may be referred to as a semiconductor area SC. At this time, a channel ch is also formed. The gate electrode 416, the semiconductor area SC of the semiconductor layer 425, the source electrode 430 and the drain electrode 432 form a thin film transistor T.

Next, a passivation layer (not shown) is formed on an entire surface of a substrate including the thin film transistor, and a common line 434 and a common electrode 436 are formed on the passivation layer through a third mask process. The common electrode 436 is parallel to the gate line 412. The common electrode 436 has a square shape corresponding to a pixel region (P).

In FIG. 10B, an insulating layer (not shown) is formed on an entire surface of the substrate including the common electrode 436 and the common line 434, and the insulating layer and the passivation layer are patterned through a fourth mask process to form a drain contact hole 438 exposing a part of the drain electrode 432.

In FIG. 10C, a pixel connecting line 440 and a pixel electrode 444 are formed on the insulating layer including the drain contact hole 438 through a fifth mask process. The pixel connecting line 440 is connected to the drain electrode 432 through the drain contact hole 438. The pixel electrode 444 extends from the pixel connecting line 440 and has a spiral shape.

Figure 11A:
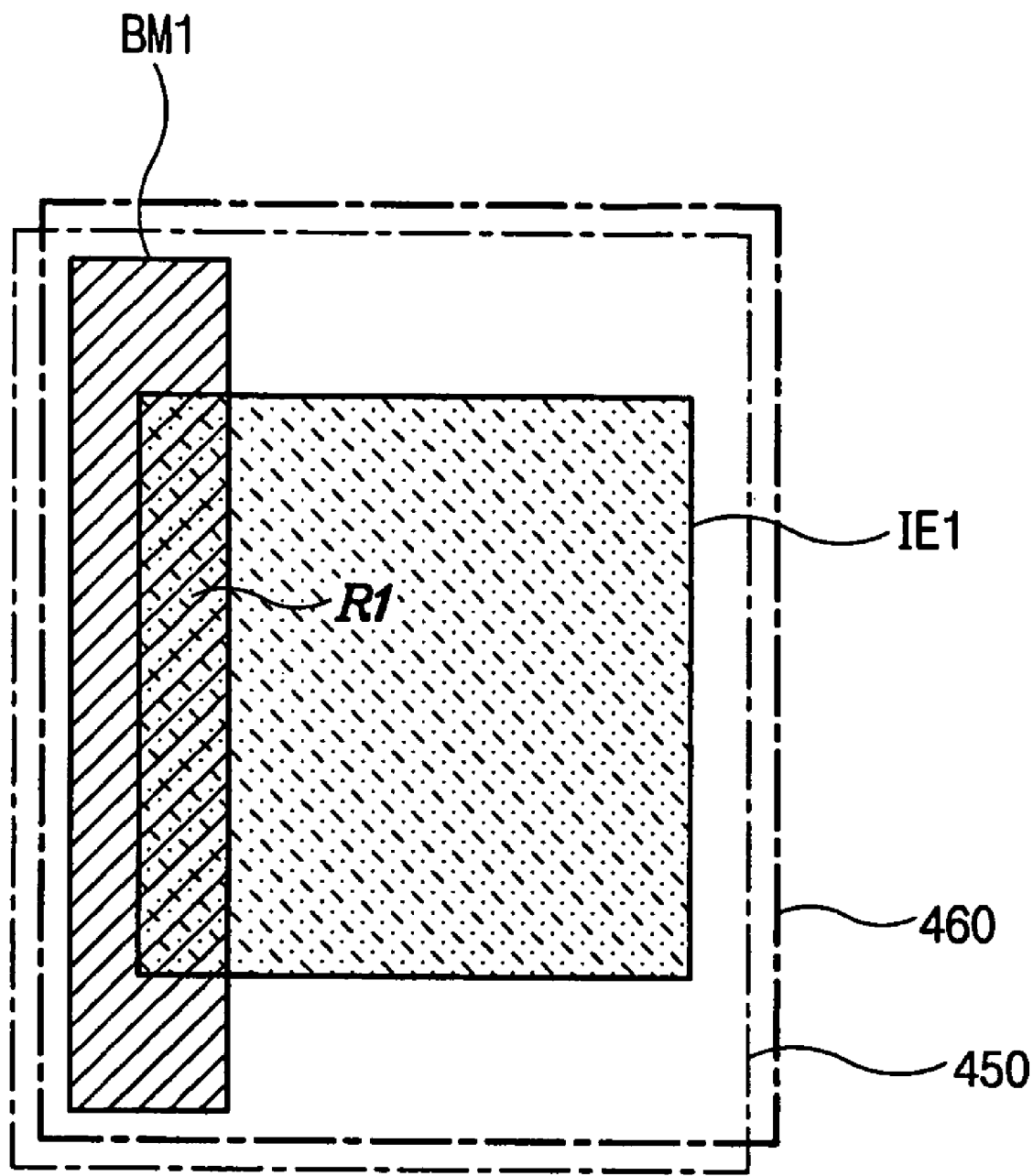
FIGS. 11A and 11B are views showing an aperture ratio according to a pattern structure of an in-plane electrode for forming a lateral electric field.
Figure 11B:
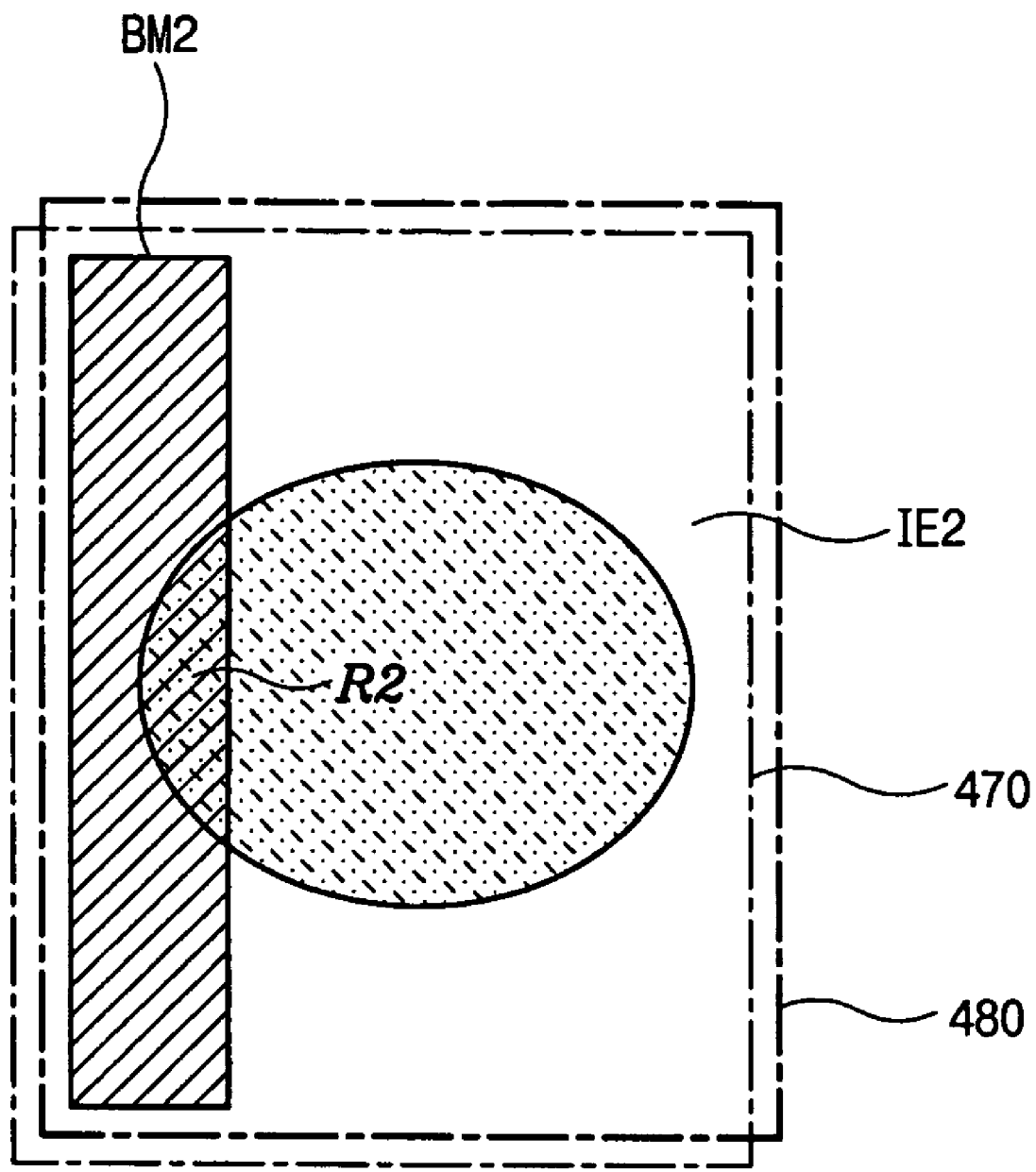

FIGS. 11A and 11B show an aperture ratio according to a pattern structure of an in-plane electrode for forming a lateral electric field. FIG. 11A illustrates a stripe pattern type of the related art, and FIG. 11B shows a circular pattern type of the present invention.

As shown in the figures, when a substrate 450 or 470, in which an in-plane electrode IE1 or IE2 is formed, is attached to another substrate 460 or 480, in which a black matrix BM1 or BM2 is formed, the black matrix BM1 or BM2 may overlap the in-plane electrode IE1 or IE2 beyond a designed value due to misalignment. This misalignment reduces the aperture area.

In FIG. 11A, one side of the in-plane electrode IE1 overlaps the black matrix BM1 along a length of the in-plane electrode IE1, whereby an overlapping portion R1 is formed. The overlapping portion R1 has a square shape due to the structure of the in-plane electrode IE1.

In FIG. 11B, since the in-plane electrode IE2 has a circular shape, an overlapping portion R2 of the in-plane electrode IE2 and the black matrix BM2 has the shape of a segment of a curved figure. Therefore, although the overlapping portions R1 and R2 have the same overlapping width, the overlapping portion R2 of FIG. 11B has a smaller area than the overlapping portion R1 of FIG. 11A. Accordingly, the margin for attaching the two substrates increases due to the electrode of the circular or circular band shape, and differences in brightness of the device decrease.

Figure 12:
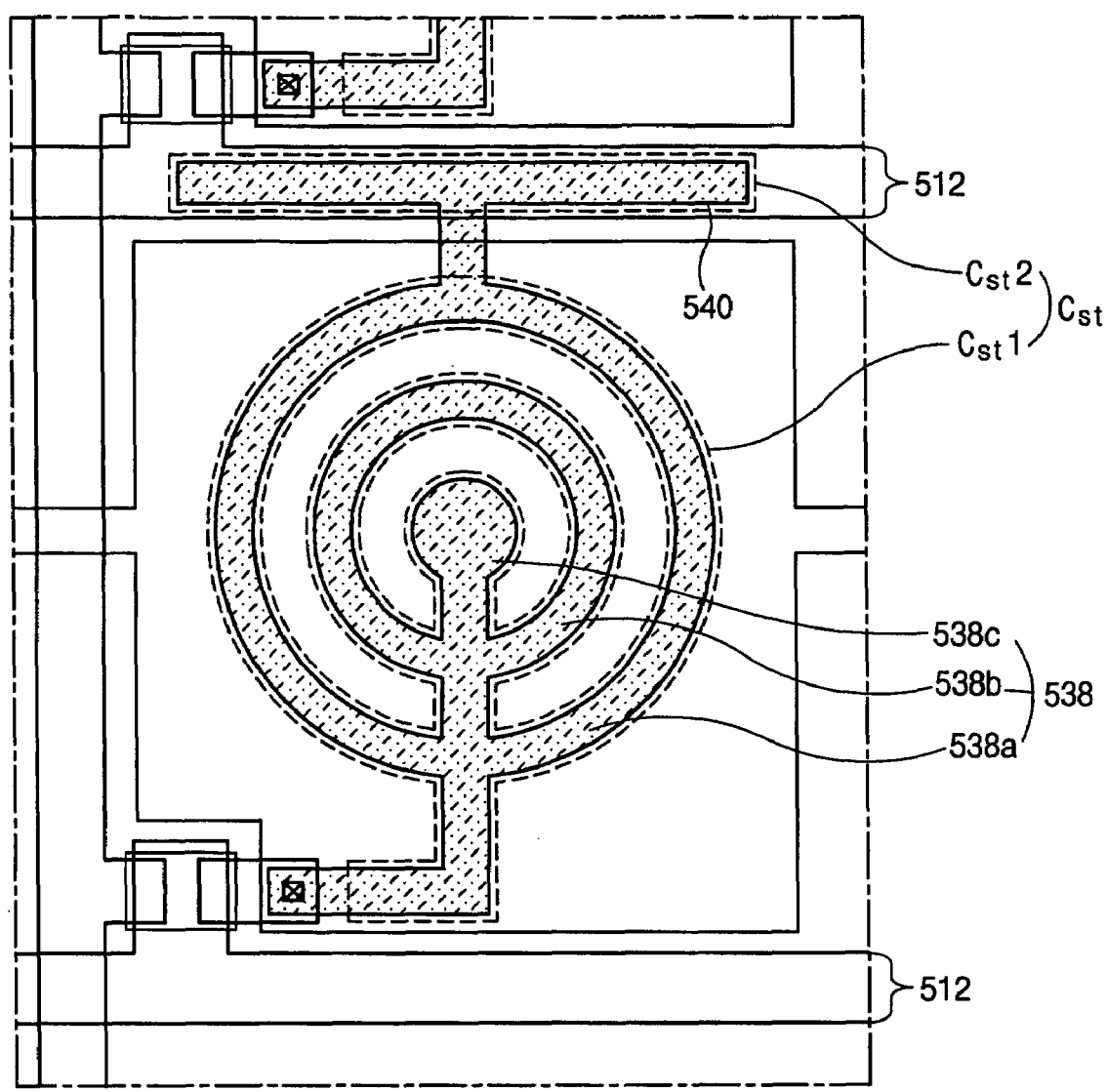
FIG. 12 is a plan view of an array substrate for an FFS mode LCD device according to a fifth embodiment of the present invention.

FIG. 12 is a plan view of an array substrate for an FFS mode LCD device according to a fifth embodiment of the present invention. The fifth embodiment has an improved storage capacitor as compared with the above embodiments. The fifth embodiment has the same structure as the first embodiment except for the storage capacitor, and explanations for the same part as the first embodiment may be omitted.

As shown in FIG. 12, a capacitor electrode 540 extends from a third pixel electrode pattern 538a, which is the outermost pattern of a pixel electrode 538, and overlaps a previous gate line 512. As before, the pixel electrode 538 contains three pixel electrode patterns 538a, 538b, and 538c. In the fifth embodiment, a first storage capacitor Cst1 between the pixel electrode 538 and a common electrode 520 and a second storage capacitor Cst2 between the capacitor electrode 540 and the gate line 512. The total storage capacitor Cst of the fifth embodiment is the sum of the first storage capacitor Cst1 and the second storage capacitor Cst2. Thus, the storage capacitor Cst of the fifth embodiment is larger than those of the previous embodiments, and increase the stability of the liquid crystal molecules when driven.

To improve the aperture ratio, the FFS mode LCD device may have a rectangular four-color pixel structure. The pixel structure includes red, green, blue and white sub pixels.

Figure 13:
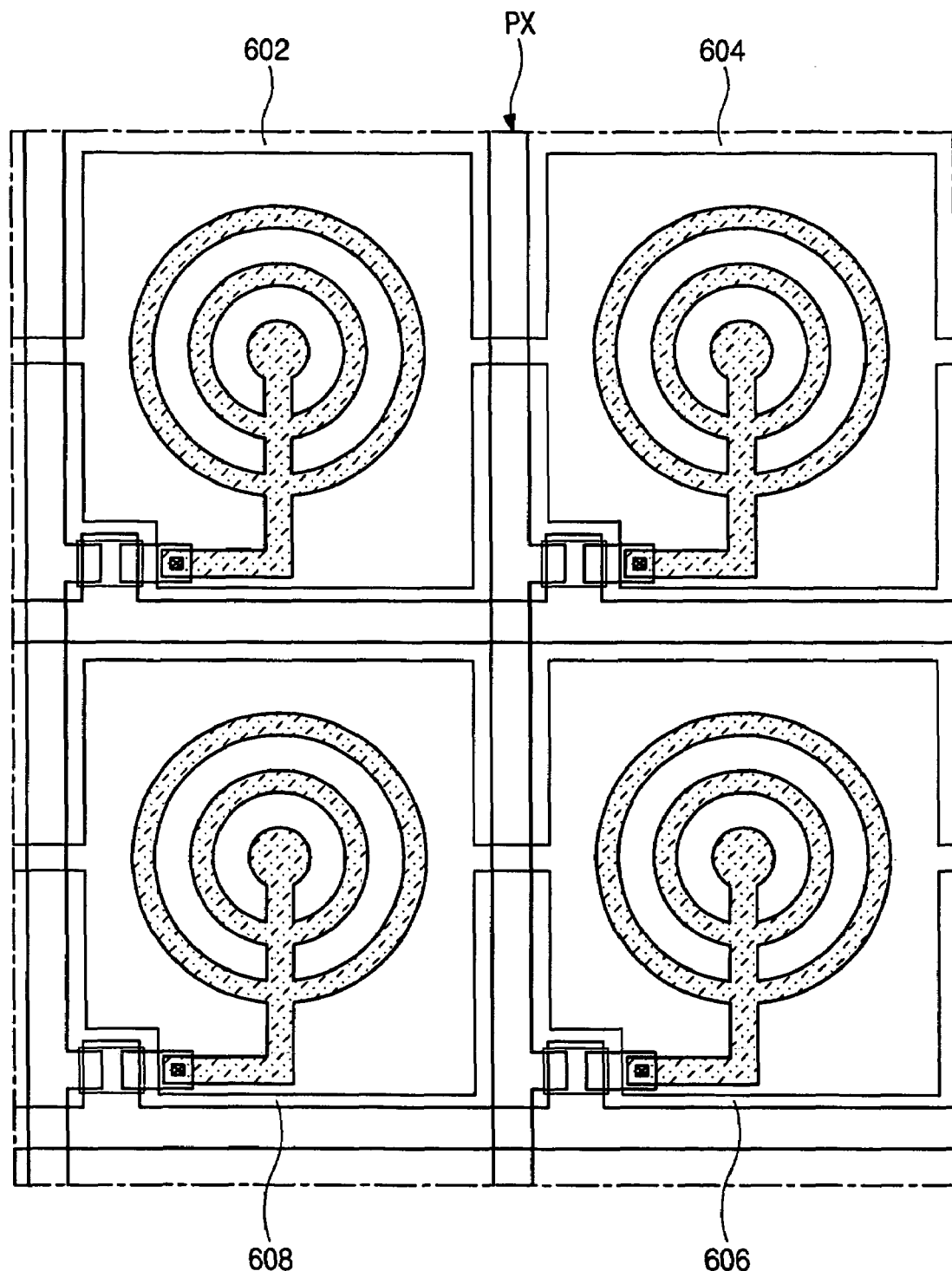
FIG. 13 is a plan view showing an FFS mode LCD device according to a sixth embodiment of the present invention.

FIG. 13 is a plan view showing an FFS mode LCD device according to a sixth embodiment of the present invention.

In a general three-color pixel structure, each sub-pixel has a rectangular shape. Therefore, the diameter of the circular or circular band electrode is determined by the width of the pixel region. Since a dummy region outside of the circular or circular band electrode occupies a large area, improvement of the aperture ratio is limited. However, in a rectangular pixel structure, few obstacles exist in determining the diameter of the circular or circular band electrode because distances from the central point of the pixel region to four sides of the rectangle are equal.

As shown in FIG. 13, an FFS mode LCD device including a circular or circular band electrode of the sixth embodiment has a four-color pixel structure to increase brightness. In this figure, rectangular pixel PX is composed of red, green, blue and white rectangular sub-pixels 602, 604, 606 and 608. Thus, utilization of the pixel region is increased, and the aperture ratio is improved.

Figure 14A:
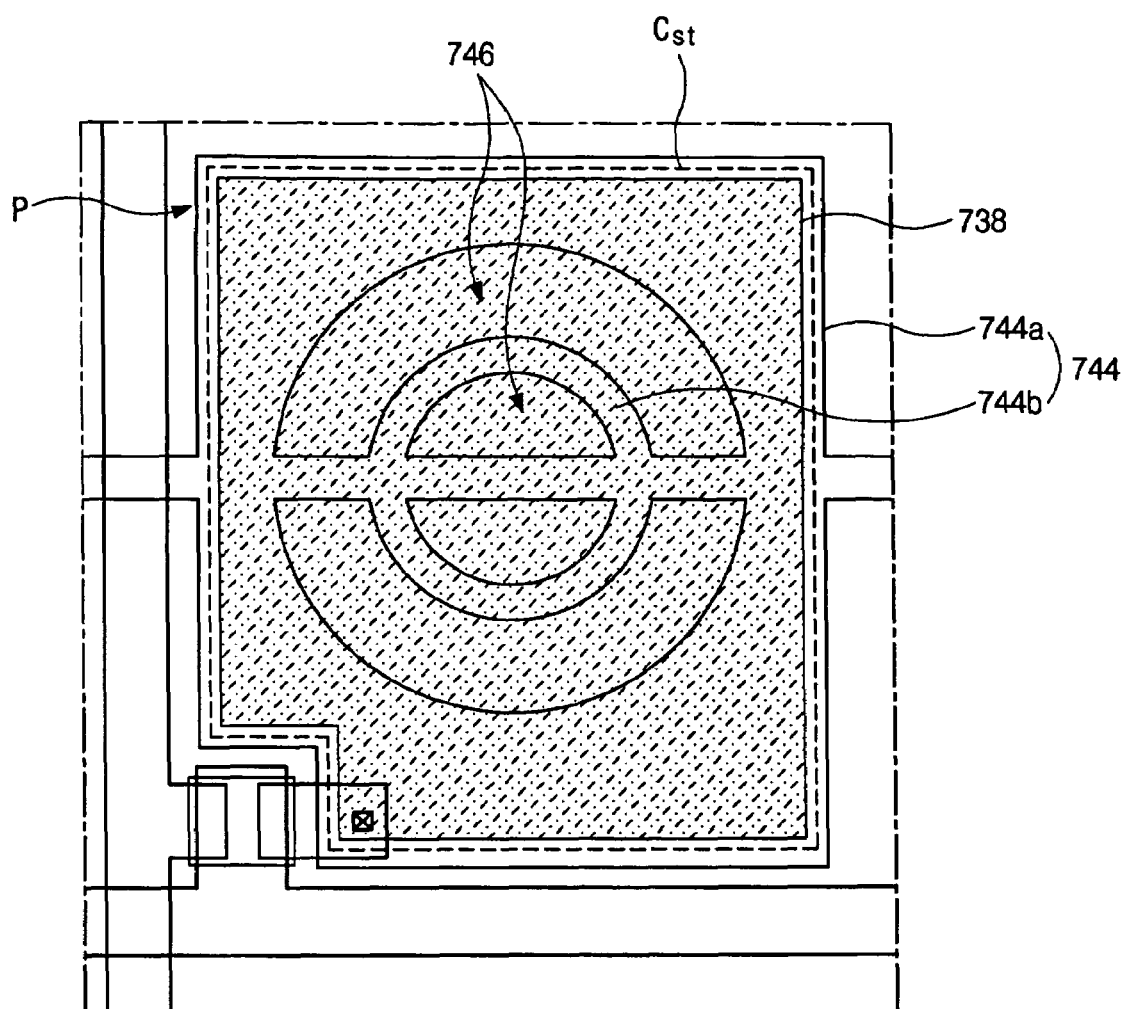
FIGS. 14A and 14B are plan views showing an array substrate for an FFS mode LCD device according to a seventh embodiment of the present invention.
Figure 14B:
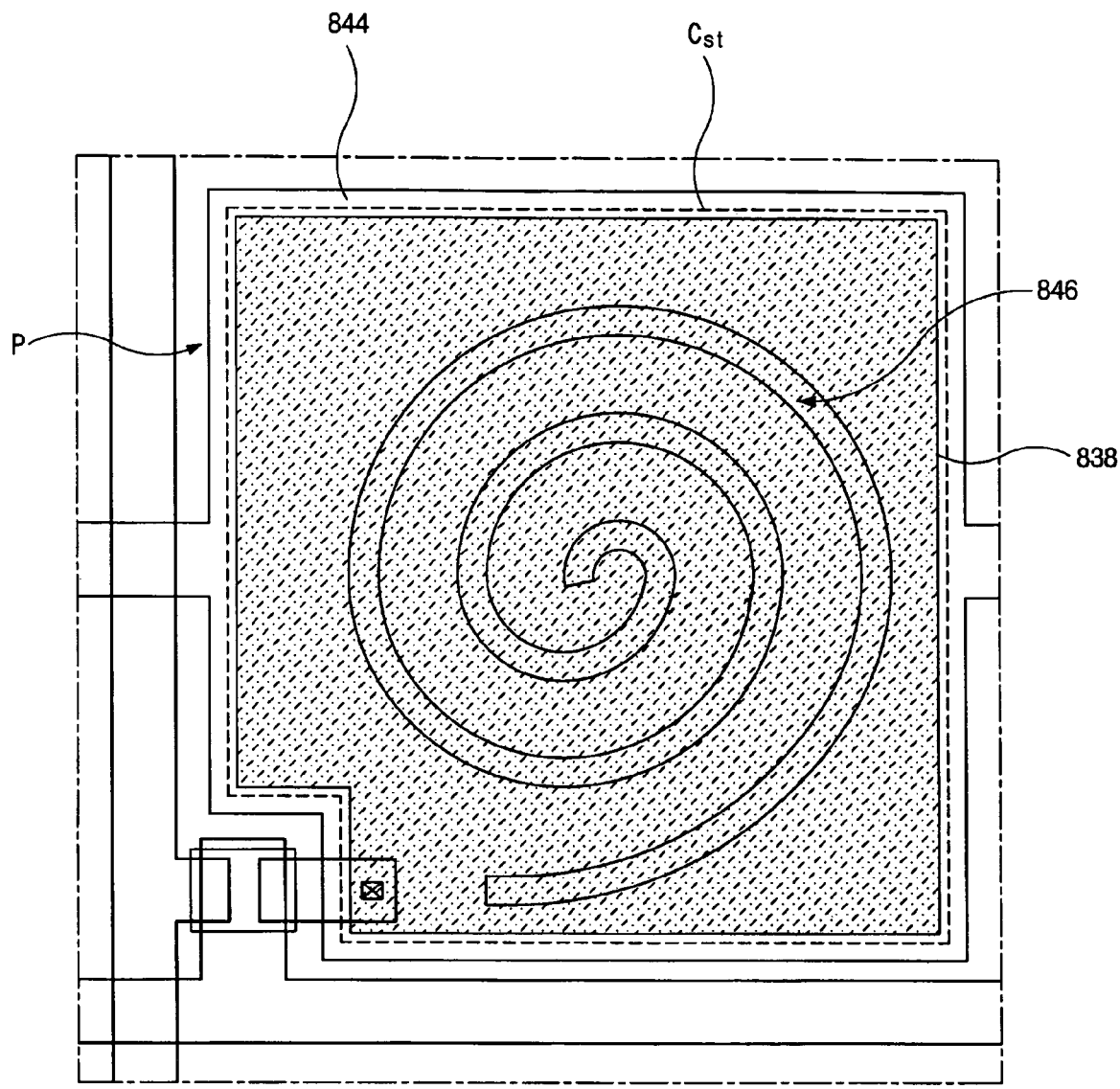

FIGS. 14A and 14B are plan views showing an array substrate for an FFS mode LCD device according to a seventh embodiment of the present invention. The FFS mode LCD device of FIG. 14A has a common electrode of a circular or circular band shape, and the FFS mode LCD device of FIG. 14B includes a common electrode of a spiral shape. Essentially, only differences from the first embodiment will be explained.

In this embodiment, a pixel electrode 738 or 838 having a square shape is formed in a pixel region P. A common electrode 744 or 844 overlaps the pixel electrode 738 or 838. The overlapped pixel electrode 738 or 838 and common electrode 744 or 844 form a storage capacitor Cst with an insulating layer interposed therebetween. The pixel electrode 738 or 838 and the common electrode 744 or 844 may be formed of a transparent conductive material such as indium tin oxide (ITO). Spaces between portions of the common electrode 744 or 844 and the overlapped portions of the common electrode 744 or 844 and the pixel electrode 738 or 838 are defined as the aperture area. Since the aperture area has a circular shape similar to the first embodiment, viewing angles characteristics are improved.

In FIG. 14A, the common electrode 744 includes a circular band shape, and in FIG. 14B, the common electrode 844 includes a spiral shape. More particularly, in FIG. 14A, the common electrode 744 has circular or circular band openings 746, and includes a first common electrode pattern 744a and a second common electrode pattern 744b inside the first common electrode pattern 744a. The second common electrode pattern 744b has a circular band shape. The pixel electrode 738 is smaller than the first common electrode pattern 744a and larger than the openings 746.

In FIG. 14B, the common electrode 844 corresponds to the pixel region P and has a spiral shape opening 846. The pixel electrode 838 is smaller than the common electrode 844 and larger than the opening 846.

The array substrate of the seventh embodiment may be manufactured as the structures and through the processes according to the first to sixth embodiments.

In the present invention, since the aperture area has a circular or circular band shape, directors of the liquid crystal material are equal in all directions and the viewing angles are improved. Additionally, the aperture ratio is increased by using a rectangular pixel structure. Furthermore, because an overlapped portion with the black matrix is reduced, the brightness difference due to misalignment is minimized when two substrates are attached.

It will be apparent to those skilled in the art that various modifications and variation can be made in an IPS-LCD device of the present invention without departing from the spirit or scope of the invention such as the pixel electrode or the common electrode having an elliptical rather than circular or spiral shape. Thus, it is intended that the present invention cover the modifications and variations of this invention provided they come within the scope of the appended claims and their equivalents.

What is claimed is:

1. A fringe field switching mode liquid crystal display device, comprising:
    a first substrate;
    a gate line on the first substrate;
    a data line crossing the gate line to define a pixel region;
    a thin film transistor connected to the gate line and the data line;
    a common line parallel to and spaced apart from the gate line;
    a common electrode extending from the common line and having a substantially square plate shape corresponding to the pixel region;
    a pixel electrode connected to the thin film transistor and having a ring shape, the pixel electrode overlapping the common electrode;
    a second substrate facing the first substrate; and
    a liquid crystal layer between the first substrate and the second substrate.

2. The device of claim 1, further comprising a pixel connecting line between the thin film transistor and the pixel electrode.

3. The device of claim 1, wherein the pixel electrode and the common electrode are formed of a transparent conductive material.

4. The device of claim 1, wherein liquid crystal molecules of the liquid crystal layer are driven by an electric field parallel to the first and second substrates in portions between patterns of the pixel electrode and overlapping areas of the common electrode and the pixel electrode.

5. The device of claim 1, wherein the pixel electrode includes a plurality of patterns of a circular shape and a circular band shape.

6. The device of claim 5, wherein the patterns of the pixel electrode have different sizes and are concentric.

7. The device of claim 6, wherein the pixel electrode includes a first pixel electrode pattern of the circular shape and second and third electrode patterns of the circular band shape, the first pixel electrode pattern disposed inside the third pixel electrode pattern and the second pixel electrode pattern disposed between the first and third pixel electrode patterns.

8. The device of claim 1, wherein the overlapped pixel electrode and common electrode form a storage capacitor with an insulating layer interposed therebetween.

9. The device of claim 1, further comprising a black matrix on an inner surface of the second substrate, the black matrix including an opening exposing the pixel region and covering edges of the common electrode.

10. The device of claim 9, wherein the opening has a circular shape.

11. The device of claim 1, wherein the pixel region has a rectangular shape.

12. The device of claim 11, wherein the pixel region corresponds to a sub-pixel, and four sub-pixels of red, green, blue and white form one pixel.

13. The device of claim 1, further comprising a capacitor electrode connected to the pixel electrode, the capacitor electrode overlapping a previous gate line to form a storage capacitor.

14. The device of claim 1, wherein the thin film transistor includes a gate electrode extending from the gate line, a semiconductor layer over the gate electrode, a source electrode extending from the data line, and a drain electrode spaced apart from the source electrode.

15. A method of fabricating a fringe field switching mode liquid crystal display device, comprising:
    forming a gate line on a substrate;
    forming a data line crossing the gate line to define a pixel region;
    forming a thin film transistor connected to the gate line and the data line;
    forming a common line parallel to and spaced apart from the gate line;
    forming a common electrode extending from the common line and having a substantially square plate shape; and
    forming a pixel electrode connected to the thin film transistor and having a ring shape, the pixel electrode overlapping the common electrode.

16. The method of claim 15, wherein the pixel electrode and the common electrode are formed of a transparent conductive material.

17. The method of claim 15, wherein forming the pixel electrode is performed after forming the common electrode.

18. The method of claim 15, wherein the pixel electrode includes a plurality of circular and circular band patterns having different sizes and being concentric.

19. A fringe field switching mode liquid crystal display device, comprising:
    a first substrate;
    a gate line on the first substrate;
    a data line crossing the gate line to define a pixel region;
    a thin film transistor connected to the gate line and the data line;
    a common line parallel to and spaced apart from the gate line;
    a common electrode connected with the common line, the common electrode corresponding to and essentially covering the pixel region;
    a pixel electrode connected to the thin film transistor, the pixel electrode overlapping the common electrode;
    a second substrate facing the first substrate; and
    a liquid crystal layer between the first substrate and the second substrate,
    wherein the pixel and common electrodes are arranged in a multi-domain structure in which liquid crystals in the liquid crystal layer are substantially radially aligned when a potential difference exists between the pixel and common electrodes.

20. The device of claim 19, wherein a portion of at least one of the pixel and common electrodes is curved.

21. The device of claim 20, wherein at least one of the pixel and common electrodes is substantially square.

22. The device of claim 19, wherein an electric field between the pixel and common electrodes is substantially constant independent of the potential difference between the pixel and common electrodes.

23. The device of claim 19, wherein the pixel and common electrodes have substantially different shapes.

24. The device of claim 19, wherein at least one of the pixel and common electrodes has rings.

25. The device of claim 24, wherein a difference between radii of successive rings is substantially constant.

26. The device of claim 19, wherein at least one of the pixel and common electrodes has a spiral.

27. The device of claim 26, wherein a difference between radii of successive laterally adjacent sections of the spiral is substantially constant.

28. The device of claim 19, wherein the pixel electrode overlaps another gate line.

29. The device of claim 19, further comprising a black matrix having an opening that defines an aperture of the pixel region.

30. The device of claim 29, wherein the opening is larger than the pixel electrode and smaller than the common electrode.

31. The device of claim 29, wherein an overlapping portion of at least one of the common and pixel electrodes and the black matrix has a curved shape.

32. The device of claim 29, wherein the opening has a circular shape.

33. The device of claim 19, wherein at least one of the common and pixel electrodes is substantially symmetric in all directions around a center of the pixel region.

34. The device of claim 19, wherein the common electrode is substantially square and has a curved opening.

35. The device of claim 34, wherein the pixel electrode is smaller than the common electrode and larger than the opening in the common electrode.

36. The device of claim 19, wherein directors of the liquid crystals are equal in all directions.

37. The device of claim 19, wherein at least one of the pixel and common electrodes have a section of a curved shape and a section of a rectangular shape.

38. The device of claim 19, wherein a pixel of the display contains a set of 22n adjacent pixel regions, in which n is an integer.

39. The device of claim 38, further comprising color filters of different colors formed on the second substrate, the set of adjacent pixel regions having 22m different color filters, where m is an integer less than or equal to n.

40. The device of claim 38, wherein the pixel and common electrodes in each pixel region in the set of adjacent pixel regions have the same shape.

41. The device of claim 38, wherein at least one of the pixel and common electrodes in a first pixel region in the set of adjacent pixel regions is a different shape from the pixel electrode or common electrode in a second pixel region in the set of adjacent pixel regions.

42. A liquid crystal display device, comprising:
a first substrate;
a gate line on the first substrate;
a data line crossing the gate line to define a pixel region;
a thin film transistor connected to the gate line and the data line;
a common line parallel to and spaced apart from the gate line;
a common electrode extending from the common line;
a pixel electrode connected to the thin film transistor;
a second substrate facing the first substrate;
a liquid crystal layer between the first substrate and the second substrate; and
wherein one of the common electrode and the pixel electrode has a substantially rectangular plate shape and the other of the common electrode and the pixel electrode has a curved shape.

43. The liquid crystal display of claim 42 wherein the shape of electrode that has a curved shape comprises a ring shape.

44. The liquid crystal display of claim 42 wherein the shape of electrode that has a curved shape comprise a spiral shape.

45. The liquid crystal display of claim 42 wherein the shape of electrode that has a rectangular shape comprise a substantially square shape.

46. The liquid crystal display of claim 42 wherein the common electrode has a substantially rectangular shape.

47. The liquid crystal display of claim 42 wherein the pixel electrode has a curved shape.

48. The liquid crystal display of claim 42 wherein the pixel electrode overlaps the common electrode.

49. The liquid crystal display of claim 42, wherein the overlapped pixel electrode and common electrode forms a storage capacitor with an insulating layer interposed therebetween.

50. A fringe field switching mode liquid crystal display device, comprising:
a first substrate;
a gate line on the first substrate;
a data line crossing the gate line to define a pixel region;
a thin film transistor connected to the gate line and the data line;
a common line parallel to and spaced apart from the gate line;
a common electrode extending from the common line and having a substantially square plate shape corresponding the pixel region;
a pixel electrode connected to the thin film transistor and having a ring shape, the pixel electrode overlapping the common electrode;
a second substrate facing the first substrate; and
a liquid crystal layer between the first substrate and the second substrate, wherein the pixel electrode and the common electrode are formed of a transparent conductive material.

51. A fringe field switching mode liquid crystal display device, comprising:
a first substrate;
a gate line on the first substrate;
a data line crossing the gate line to define a pixel region;
a thin film transistor connected to the gate line and the data line;
a common line parallel to and spaced apart from the gate line;
a common electrode extending from the common line and having a substantially square plate shape corresponding to the pixel region;
a pixel electrode connected to the thin film transistor and having a ring shape, the pixel electrode overlapping the common electrode;
a second substrate facing the first substrate;
a black matrix on an inner surface of the second substrate, the black matrix including an opening exposing the pixel region and covering edges of the common electrode; and
a liquid crystal layer between the first substrate and the second substrate.

52. A fringe field switching mode liquid crystal display device, comprising:
a first substrate;
gate lines on the first substrate;
data lines crossing the gate lines to define a plurality of pixel regions;

thin film transistors connected to the gate lines and the data lines;

common lines parallel to and spaced apart from the gate lines;

a plurality of common electrodes extending from the common lines and having a substantially square plate shape corresponding to each of the plurality of pixel regions;

a plurality of pixel electrodes connected to the thin film transistors and having a ring shape, the plurality of pixel electrodes overlapping the plurality of common electrodes;

a second substrate facing the first substrate; and a liquid crystal layer between the first substrate and the second substrate.

* * * * *